(12) United States Patent
Isomura et al.

(10) Patent No.: US 6,285,783 B1
(45) Date of Patent: *Sep. 4, 2001

(54) PATTERN DATA GENERATING APPARATUS AND METHOD FOR INSPECTING DEFECTS IN FINE PATTERNS IN A PHOTOMASK OR SEMICONDUCTOR WAFER

(75) Inventors: Ikunao Isomura, Yokohama; Hideo Tsuchiya, Kawasaki, both of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,156

(22) Filed: Sep. 25, 1997

(30) Foreign Application Priority Data

Sep. 26, 1996 (JP) .................................................. 8-254987

(51) Int. Cl.$^7$ ...................................................... G06K 9/00
(52) U.S. Cl. .......................... 382/147; 382/140; 382/145; 382/173; 382/181
(58) Field of Search .................................... 382/147, 145, 382/144, 140, 149, 151, 173

(56) References Cited

U.S. PATENT DOCUMENTS

| | | | |
|---|---|---|---|
| 3,612,220 | * | 10/1971 | Hall ........................................ 187/295 |
| 4,593,407 | * | 6/1986 | Konishi et al. ........................ 382/297 |
| 4,860,371 | * | 8/1989 | Matsuyama et al. ................... 382/8 |
| 4,953,224 | * | 8/1990 | Ichinose et al. ........................ 382/8 |
| 5,016,001 | * | 5/1991 | Minagawa et al. .................... 340/747 |
| 5,046,113 | * | 9/1991 | Hoki ...................................... 382/8 |
| 5,182,812 | * | 2/1993 | Yamashita et al. ..................... 382/8 |
| 5,185,812 | * | 2/1993 | Yamashita ............................. 382/8 |
| 5,235,400 | * | 8/1993 | Terasawa et al. ..................... 356/239 |
| 5,379,348 | | 1/1995 | Watanabe et al. .................... 356/237 |
| 5,404,410 | | 4/1995 | Tojo et al. ............................. 382/8 |
| 5,475,766 | * | 12/1995 | Tsuchiya et al. ..................... 382/144 |
| 5,577,171 | * | 11/1996 | Arai et al. ............................ 395/112 |
| 5,872,871 | * | 2/1999 | Yokoyama et al. .................. 382/151 |

FOREIGN PATENT DOCUMENTS 63-3450    1/1988 (JP) .
1-305344   12/1989 (JP) .

OTHER PUBLICATIONS

James N. Wiley, et al., "Comprehensive Detection of Defects On Reduction Reticles," SPIE, vol. 2196, pp. 219–233.

* cited by examiner

Primary Examiner—Matthew C. Bella
Assistant Examiner—Sheela Chawan
(74) Attorney, Agent, or Firm—Oblon, Spivak, McClelland, Maier & Neustadt, P.C.

(57) ABSTRACT

A pattern data development/generation apparatus includes a pattern generation circuit for obtaining a share of a target pattern in each square and outputting share data in reading pattern design data, decoding pattern data including a pattern shape, a pattern position and a pattern size, and assigning the decoded output data to the squares having an appropriate size as a unit, a pattern memory for holding a predetermined range of the share data generated by the pattern generation circuit, and a pattern memory readout circuit for reading out the share data of each square.

40 Claims, 17 Drawing Sheets

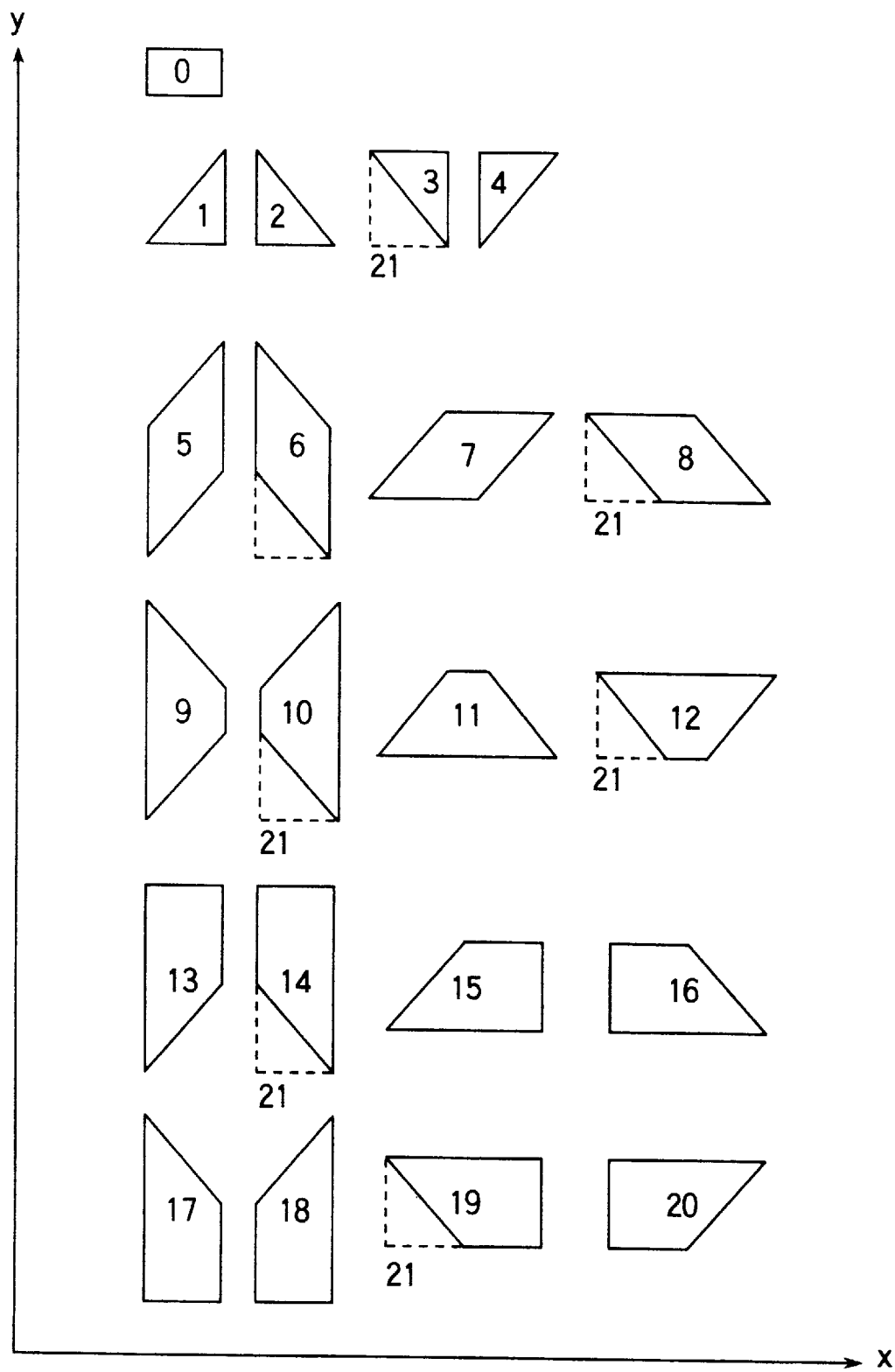
F I G. 2

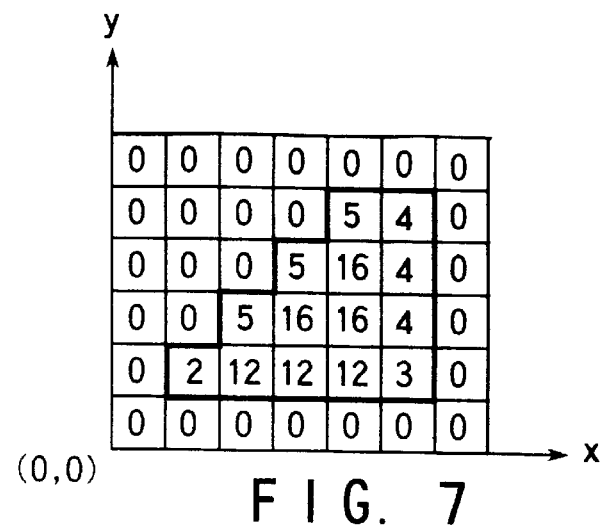
F I G. 7
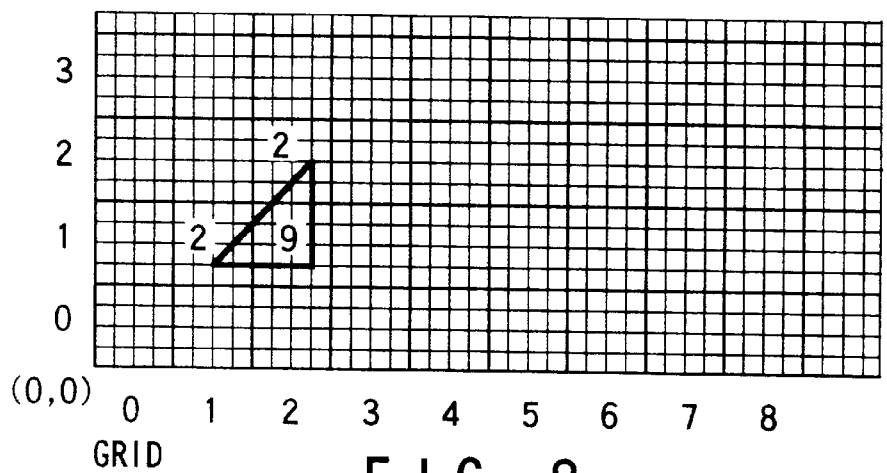
F I G. 8
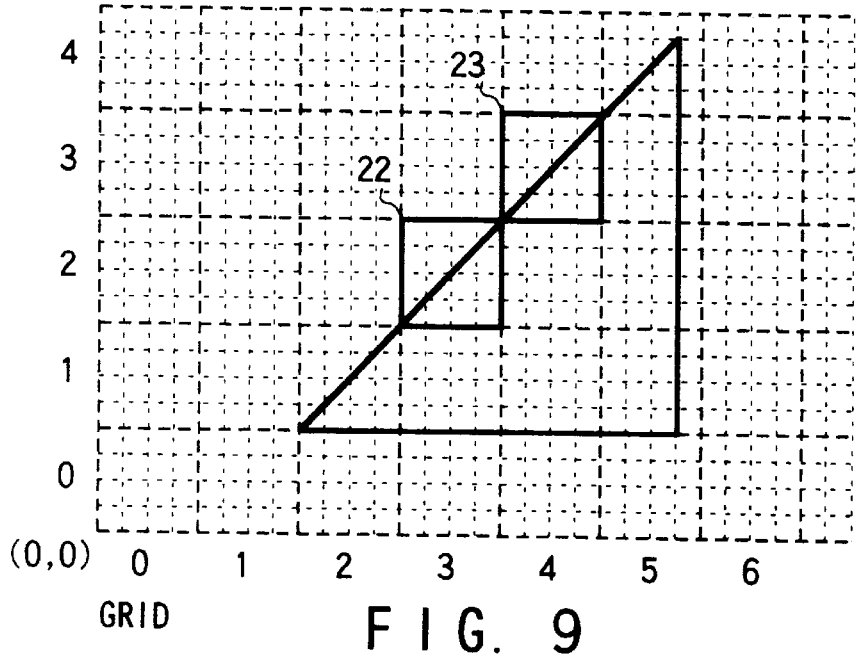
F I G. 9

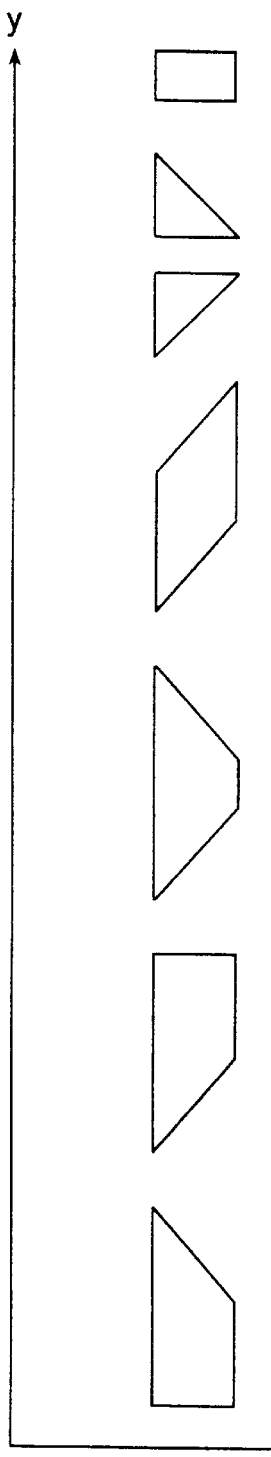
F I G. 11
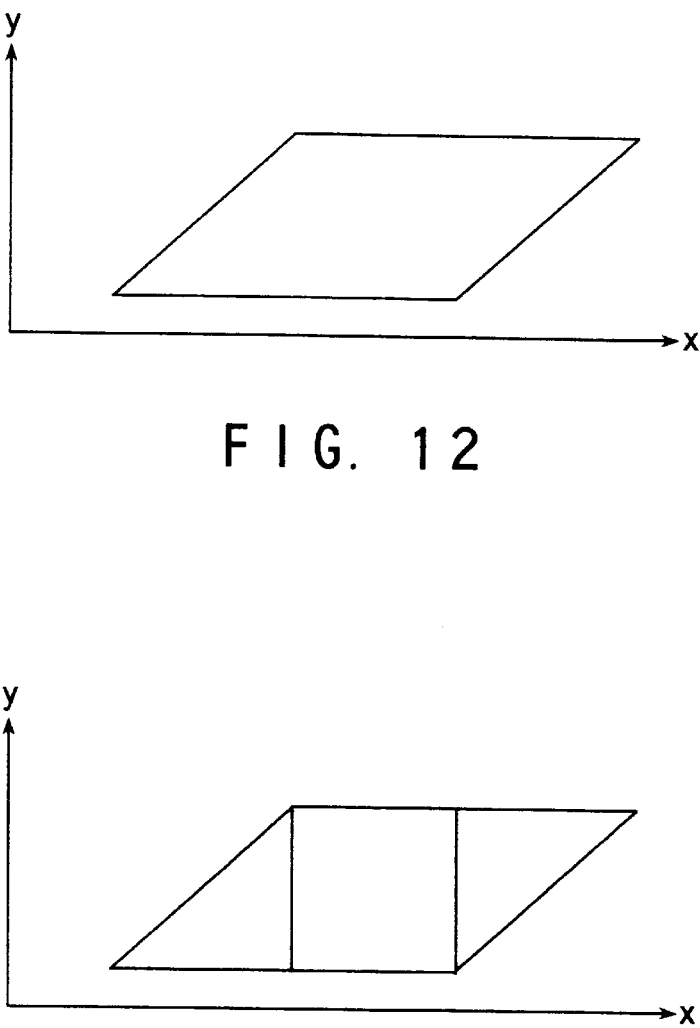
F I G. 12
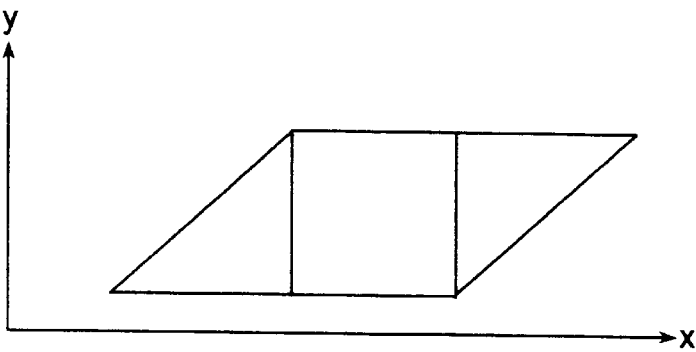
F I G. 13

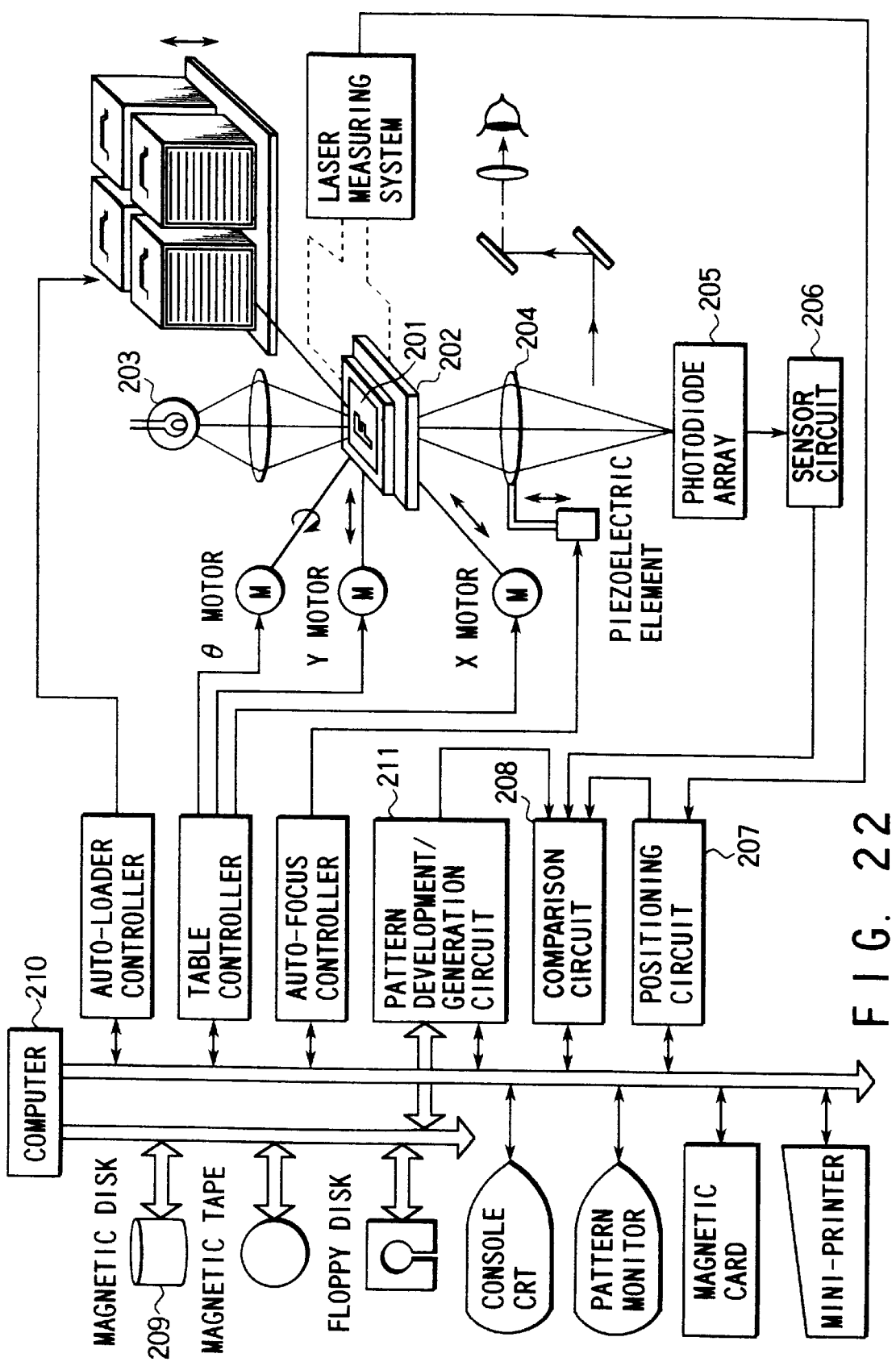
F I G. 22

EDGE EMPHASIS METHOD

NO-CHROMIUM METHOD

HALFTONE METHOD

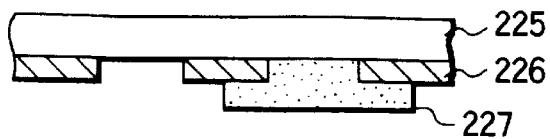
F I G. 28 A
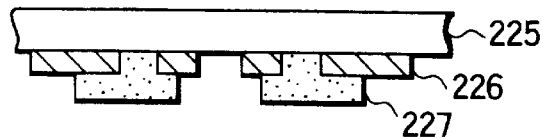
F I G. 28 B
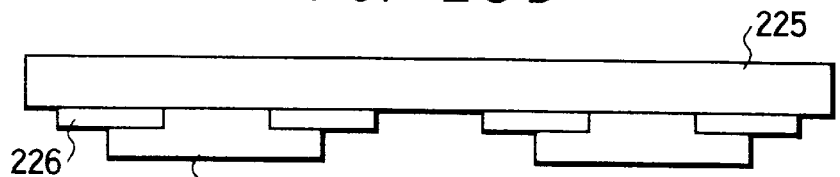
F I G. 29 A
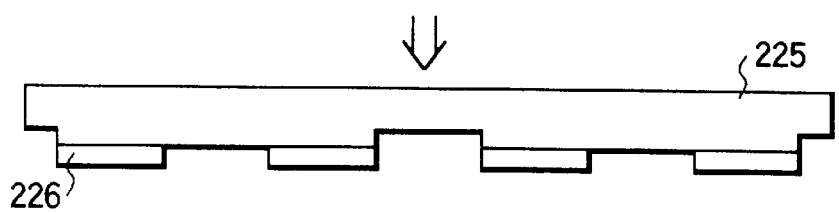
F I G. 29 B
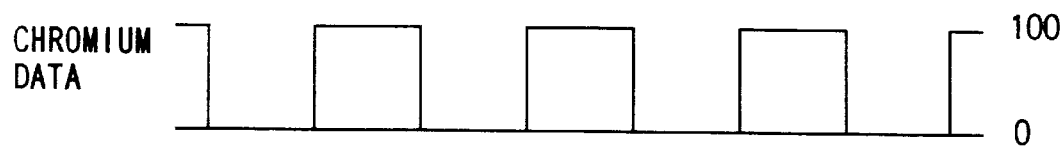
F I G. 29 C
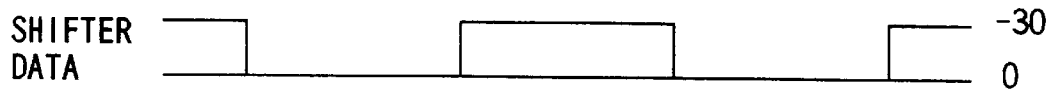
F I G. 29 D
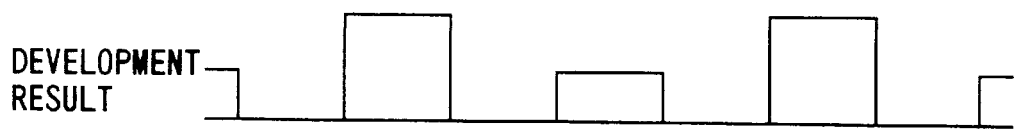
F I G. 29 E

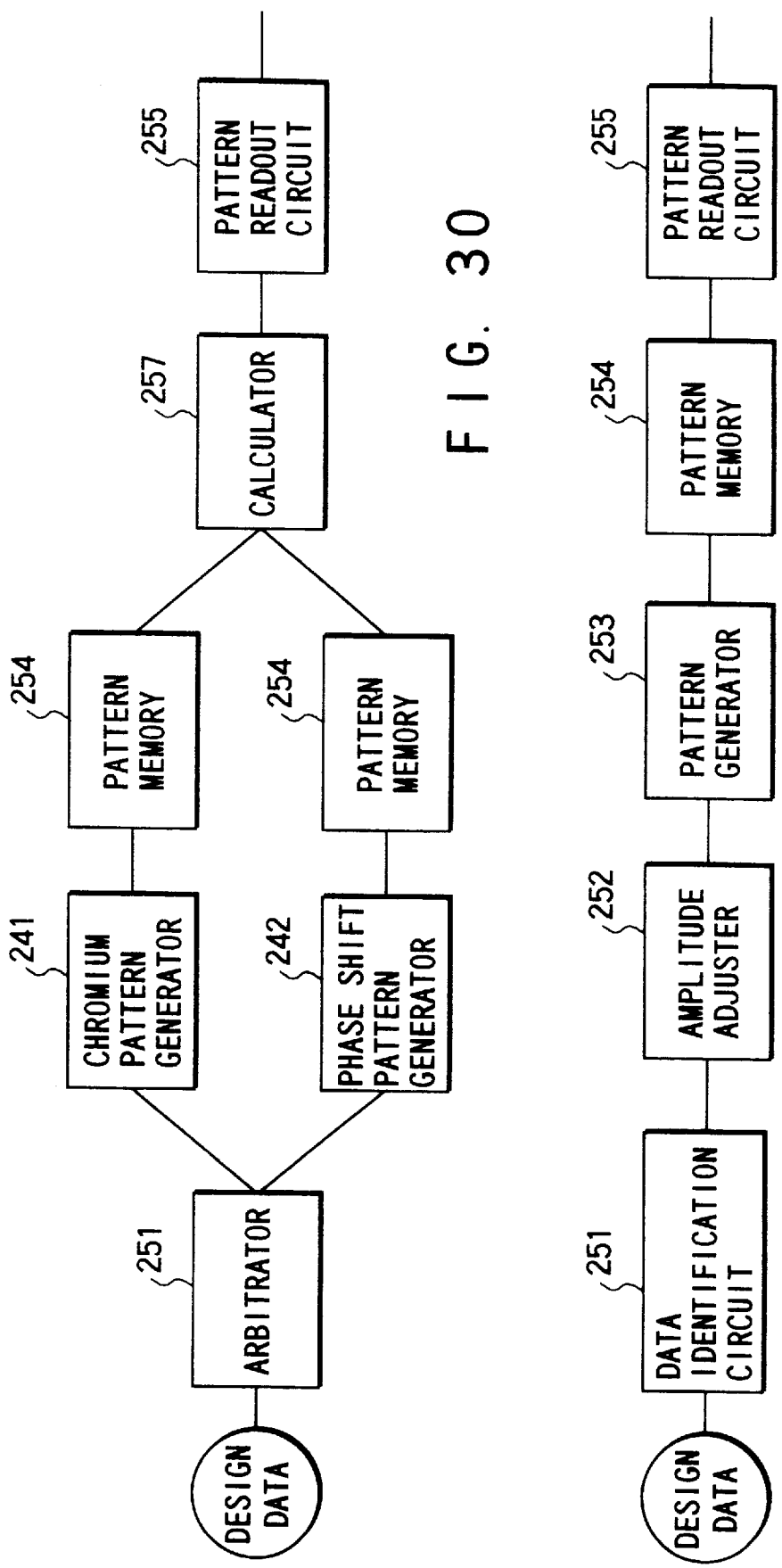

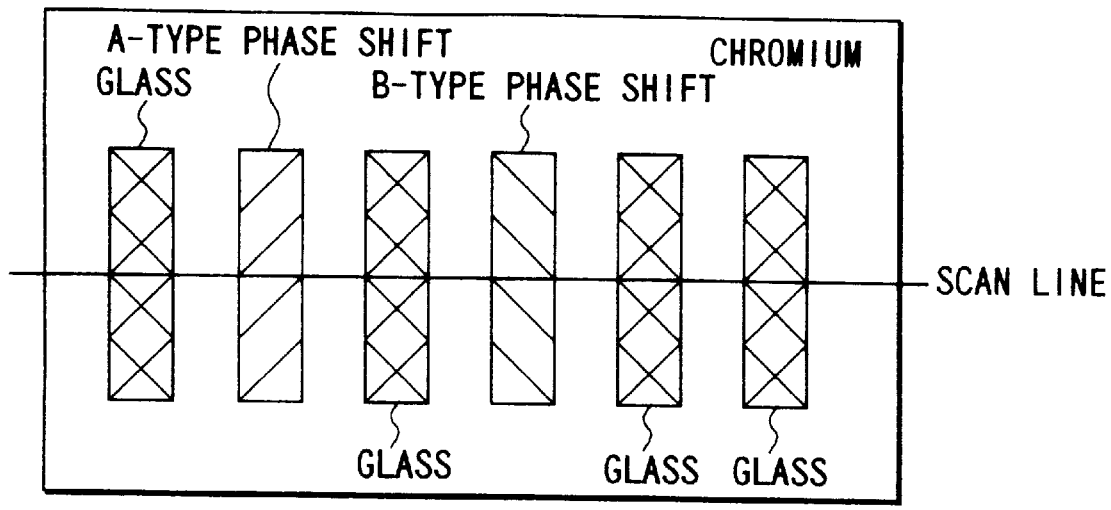
F I G. 32A
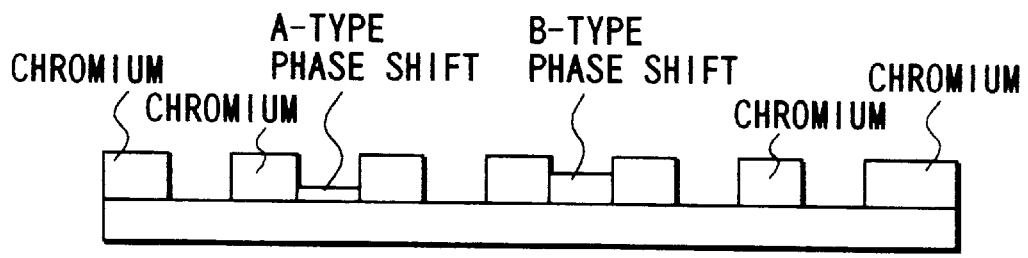
F I G. 32B
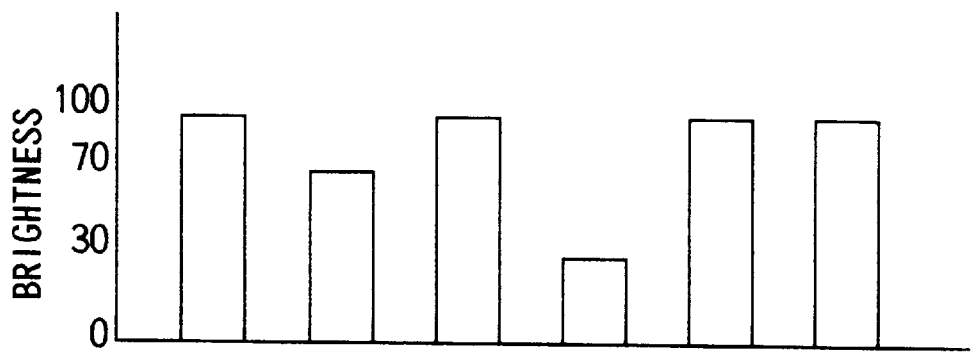
F I G. 32C

PATTERN DATA GENERATING APPARATUS AND METHOD FOR INSPECTING DEFECTS IN FINE PATTERNS IN A PHOTOMASK OR SEMICONDUCTOR WAFER

BACKGROUND OF THE INVENTION

The present invention relates to a pattern inspection machine for inspecting the defects of an object and, more particularly, to a pattern data generating apparatus used for inspecting defects in a very small pattern in a photomask or wafer used to manufacture semiconductor devices or an apparatus for inspecting the defects of a liquid crystal substrate, and a pattern inspection machine using the pattern data generating apparatus.

One of the important causes which reduces the yield in the manufacture of large scale integrated circuits (LSIs) is a defect in a photomask used in manufacturing devices according to photo lithographic technology. In recent years, the size of a pattern formed along with the development of LSIs is reduced, and accordingly the size of the pattern to be detected as the defect is greatly reduced. High precision is required to detect the defect of the pattern. As an example of a configuration method for a machine for inspecting such a defect, there is available an inspection machine for detecting the defect of a pattern by comparing pattern design data used to form the pattern with actual measurement data. This machine requires a data generating circuit for generating the pattern design data used in forming the pattern and sending the generated data to a comparison circuit. A conventional data generating circuit performs so-called binary bit pattern generation. In the binary bit pattern generation, design data are developed into patterns one by one in accordance with a predetermined hierarchical structure. In accordance with the shape and size of a pattern, a pattern is expressed by the presence/absence of bits, i.e., "1" and "0" in the squares constituting a pattern having a predetermined size as a unit.

In this binary bit pattern generation, the inspection machine preferably matches the size of a grid of a pattern which is determined as one of operation parameters with a design grid size intended in preparing design data by a pattern designer due to the following reason. When these sizes are different from each other, for example, the edge portion of a pattern has an error at a maximum of ±1 pixel in the grid size of the bit pattern of the machine. The inspection machine tends to erroneously detect a shift in edge position. When a defect determination threshold value becomes less strict to prevent this erroneous detection, a defect to be detected may be missed.

Recent demand has arisen for reducing the size of a design pattern. That is, the design grid size must be further reduced. An inspection machine as a target of the present invention is of a database comparison type in which measurement data is compared with design data used to obtain the target measurement data. The generation rate of the pattern data greatly depends on the speed of the inspection machine. In the conventional binary bit generation, since the grid size of a bit pattern is determined depending on the grid size of the design data, a decrease in grid size requires a larger number of bits in bit generation of patterns having the same size. Therefore, the inspection machine must comprise a high-speed data processing circuit if the processing time in units of patterns is kept unchanged.

Similarly, when the volume of bit pattern data increases, the size of a circuit portion for filtering the bit pattern data must be increased. This filtering process is a process for acquiring the optical image of a target inspection pattern and, particularly, a process for simulating blur caused by the characteristics of an optical system, a sensor, and the like. In the conventional inspection machine, the blur is obtained by convoluting a point spread function on the order of about 10×10 pixels of bit-developed two-dimensional bit pattern data. When the bit pattern size of design data is reduced without changing an observation region size, the matrix arrangement of 10×10 pixels must be increased.

In pattern generation, data is generated into "1" or "0" depending on whether a pattern portion is present in a pattern grid. The squares of the bit pattern are formed in a checkerboard pattern by lines along the X- and Y-axes. No problem occurs when a pattern is constituted by only line segments along the X- and Y-axes. If a pattern has an inclined line, the inclined line crosses a square. In this case, this square should take a value of "0.5", strictly speaking. It is impossible to take such a value in binary development. The value of "0.5" is chopped to "0" or rounded up to "1". In either case, when design data having an inclined line is generated, some errors are included in the generation itself in a scheme of counting "1"s and "0"s. This problem can be solved by Jpn. Pat. Appln. KOKAI Publication No. 1-305344 in which a rectangular equilateral triangle is used as a unit area. In this case, however, a pattern is formed using a larger number of bits, a long processing time is required, and therefore this method is not practical. If pattern data can be generated not into "1" and "0", but into multivalue gray scale data, a more accurate result can be sent to a subsequent comparison circuit at high speed.

As previously described, when the design grid size is reduced, the bit generation circuit and the filter circuit which process the design data must process a large volume of data at high speed. The conventional system for filtering the binary bit pattern data has no room for improvement.

It is, therefore, an object of the present invention to provide a pattern data generating apparatus which can increase an apparent circuit operation speed by using a multivalue bit generation circuit and can improve the precision in terms of an improvement of an error of a conventional circuit which occurs in processing a portion containing inclined line or lines.

BRIEF SUMMARY OF THE INVENTION

According to the present invention, there is provided a pattern data generating apparatus comprising a storage for storing pattern design data, and a pattern generation circuit for reading out the pattern design data from the storage, decoding a pattern shape, a pattern position and a pattern size, calculating a share of the pattern with respect to the square for each square in which a processing pattern is included, to output share data with multivalue, and assigning the decoded output to the squares having an appropriate size as a unit.

The pattern data generating apparatus includes a pattern memory for storing the share data generated by the pattern generation circuit within a predetermined constant range.

According to the present invention, there is provided a multivalue gray scale pattern generation method of expressing an input pattern shape, an input pattern position, and an input pattern size into pixels having a predetermined size as a unit at densities of n gray scale levels on the basis of data representing an input pattern shape, position, and size, comprising inputting the pattern position and the pattern size with a precision of not less than 1/n of unit pixels, and calculating a share of the pattern in n×n pixels of interest, thereby expressing densities of the pattern.

According to the present invention, there is provided a pattern inspection machine comprising an image acquisition section for irradiating light having an appropriate wavelength on a specimen on which a pattern is formed, and acquiring measurement pattern data corresponding to a pattern image received by a photosensor, a memory for storing pattern design data used to form the pattern on the specimen, a data development section for developing for each pixel the pattern design data read out from the memory, and a determination section for comparing data obtained by filtering the data developed by the data development section with the measurement pattern data, and determining the presence/absence of a defect of the pattern formed on the specimen, wherein when the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, data obtained by developing the light shield pattern design data and the phase shift pattern design data by the data development section are subjected to an arithmetic operation in an output section of the memory, so that the data obtained by developing the light shield pattern design data and the phase shift pattern design data can be so output as to define the data on the same coordinate system.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 2 is a view showing various patterns applied to the pattern data generating of the present invention;

FIG. 7 is a view showing the bit pattern of the pattern shown in FIG. 6;

FIG. 8 is a view showing still another pattern used in pattern generation;

FIG. 9 is a view showing further another pattern used in pattern generation;

FIG. 11 is a view showing basic patterns;

FIG. 12 is a view showing a pattern given for pattern generation;

FIG. 13 is a view showing pattern data when the pattern in FIG. 12 is applied to a preprocessor;

FIG. 22 is a diagram showing the arrangement of a pattern inspection machine according to an embodiment of the present invention;

FIGS. 28A and 28B are views showing a photomask in which a chromium pattern and a phase shift pattern are mixed;

FIGS. 29A to 29E are views for explaining a development method when a recessed phase shift mask is used;

FIG. 30 is a block diagram for explaining a circuit for generating a pattern in accordance with parallel processing;

FIG. 31 is a block diagram showing the arrangement of a pattern data development and generating apparatus having a pattern generation circuit for generating both chromium and phase shift patterns; and FIGS. 32A to 32C are views for explaining brightness signals when three or more types of data are present.

DETAILED DESCRIPTION OF THE INVENTION

Figure 1:
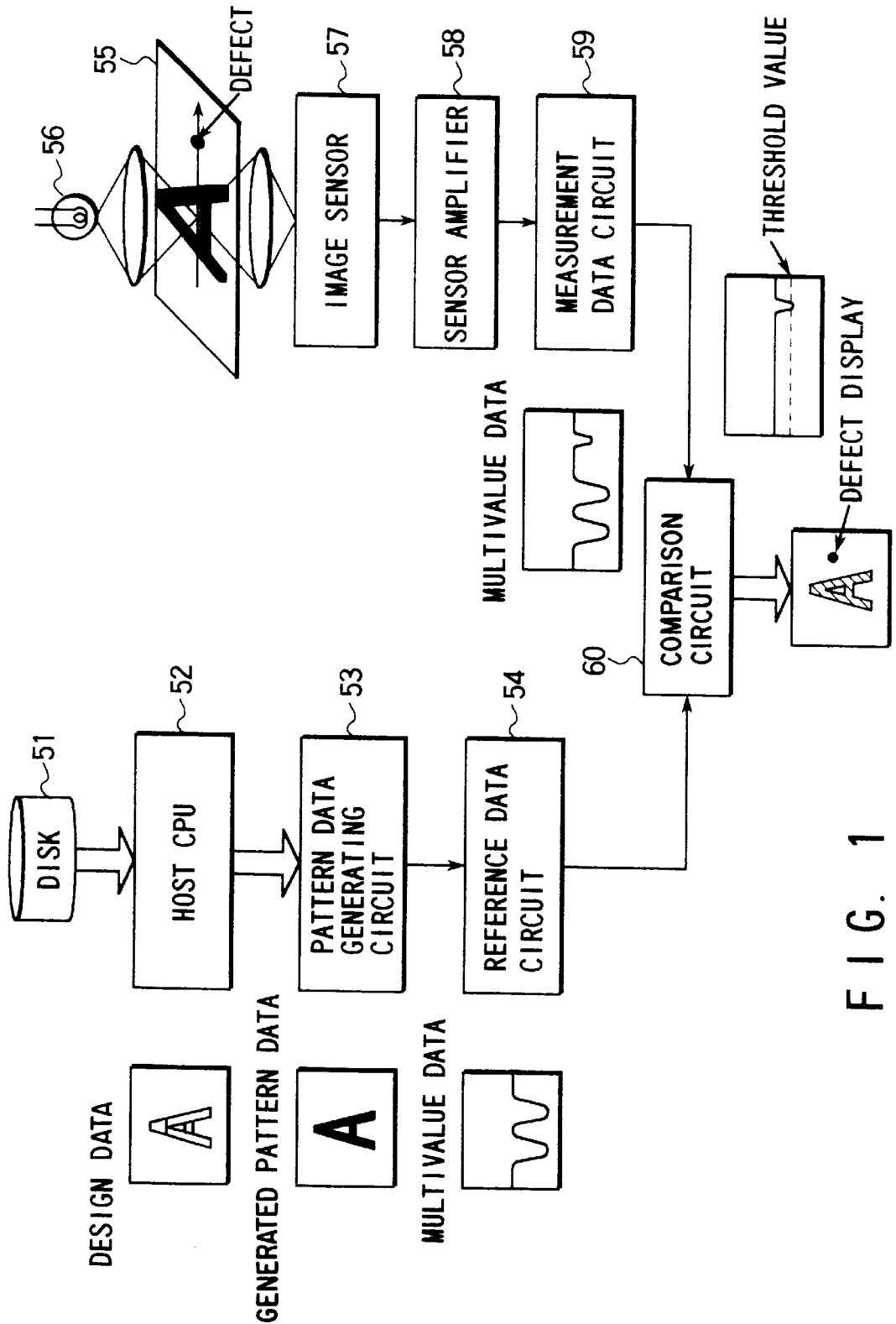
FIG. 1 is a diagram showing the schematic arrangement of a mask defect inspection machine using a pattern data generating apparatus of the present invention.

Referring to FIG. 1, design data is stored in a hard disk 51 in a host CPU 52. The host CPU 52 sends design data read out from the hard disk 51 to a pattern data generating circuit 53 of the present invention. The pattern data generating circuit 53 processes the design data in a manner to be described later to output generated pattern data. The generated pattern data is sent to a reference data circuit 54 as reference data.

A mask 55 formed on the basis of the design data is scanned with an optical scanner 56 and converted into an image signal by an image sensor 57. This image signal is amplified by a sensor amplifier 58 and sent to a measurement pattern data circuit 59. The measurement pattern data circuit 59 converts the image signal into multivalue data which serves as target measurement data. The target measurement data is sent to a comparison circuit 60 together with the reference data from the reference data circuit 54 and compared therewith. As a result of comparison, the defect of the target measurement mask pattern is detected.

The pattern data generating apparatus according to an embodiment of the present invention which is applied to the above mask defect inspection machine will be described below.

According to this embodiment, input design data corresponds to lowest layer data described in an appropriate hierarchical structure and is normally stored in a hard disk in a computer (host CPU) for controlling the apparatus as described above. The pattern data is then loaded by a processor of the pattern data generating apparatus.

More specifically, assume that the type of pattern processed by the pattern data generating apparatus of the present invention is a pattern constituted by line segments which extend in the X- and Y-axis directions and the inclined 45° direction. Where a pattern having inclined line segments except for the inclined line segments extending in the 45° direction is present, this pattern is divided into the above basic patterns in accordance with an appropriate algorithm.

Referring to FIG. 2, numbers assigned to the respective patterns represent pattern codes, respectively. The origin of each pattern is determined to be the smallest value in the pattern with reference to the lower left corner, i.e., the intersection between the X- and Y-coordinates. For example, a triangle having a pattern code of 3 has the origin as a position 21.

Figure 3:
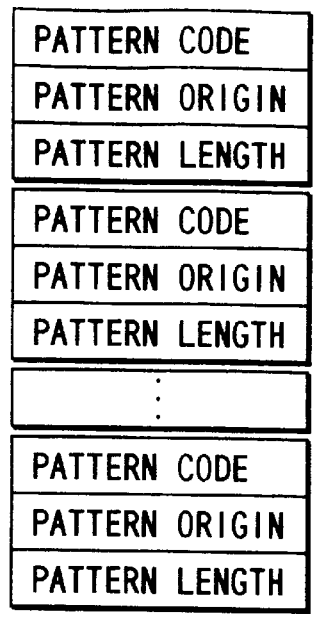
FIG. 3 is a view showing the format of pattern data applied to the pattern data generating apparatus.

The format of pattern data loaded by the processor (host computer 52), i.e., design data stored in the disk 51 is shown in FIG. 3. As can be apparent from FIG. 3, the type of pattern, the position of the origin of the pattern, and lengths in the vertical and horizontal directions are given as pattern data.

In the first embodiment, the share of the pattern in each square is expressed as one of 0/16, 1/16, 2/16, . . . , 15/16, and 16/16, i.e., 17 gray scale levels. A pattern grid size is four times a design grid size. The number of gray scale levels (i.e., multi-level) can be not less than 17 or 18. The same sequence as described above can be used to develop data into gray scale data with the number of gray scale levels smaller than 17.

Since the pattern grid size is set four times the design grid size, the origin and side lengths of a loaded pattern are accurately described in ¼ the grid size. For example, when the pattern grid size (i.e., the size of each square) is 0.2 μm, the design grid size is 0.05 μm, i.e., ¼ the pattern grid size. At this time, assume that the type of pattern is a vertically elongated parallelogram, and the origin (x, y) of the pattern and the lengths 11 and 12 (these lengths are defined as lengths extending in the X- and Y-axis directions, respectively) are given as x=0.7 μm, y=0.15 μm, 11=0.55 μm, and 12=1.15 μm. In this case, in the pattern grid size, the origin (X, Y) of the pattern, the lengths L1 and L2 of the pattern (x, y, 11, and 12 are divided by 0.2 μm) are given as follows.

$$X=3\tfrac{2}{4}\ Y=\tfrac{3}{4},\ L1=2\tfrac{3}{4},\ L2=5\tfrac{3}{4}$$

Figure 4:
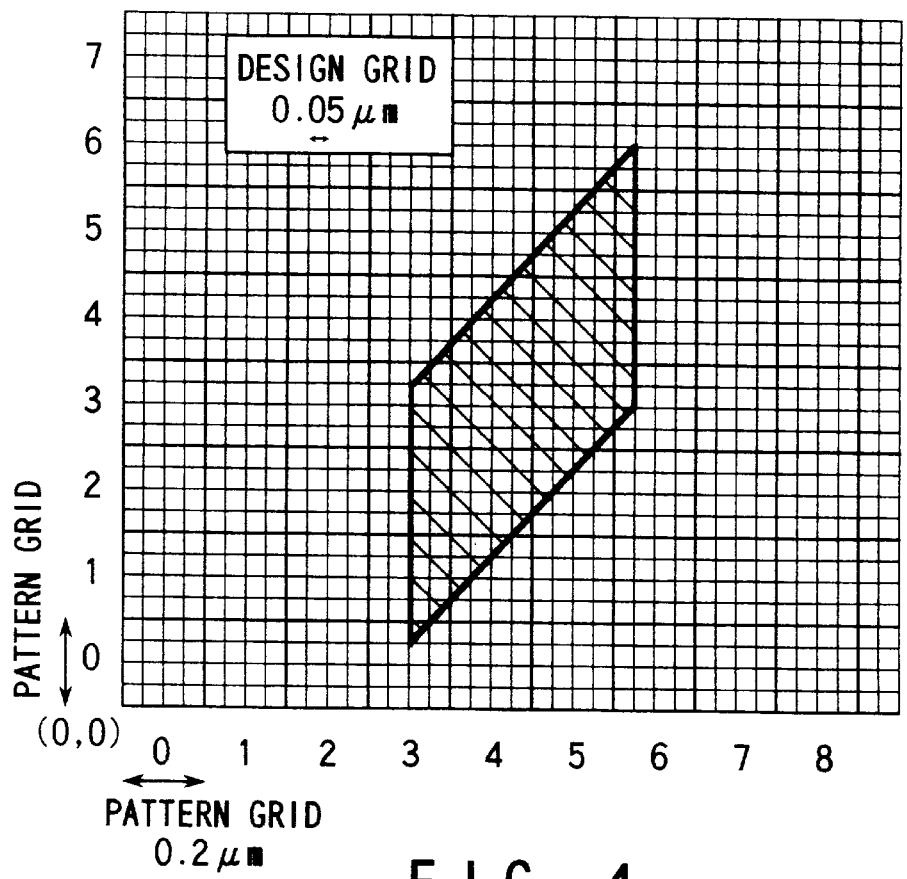
FIG. 4 is a view showing a pattern used in pattern generation.
Figure 5:
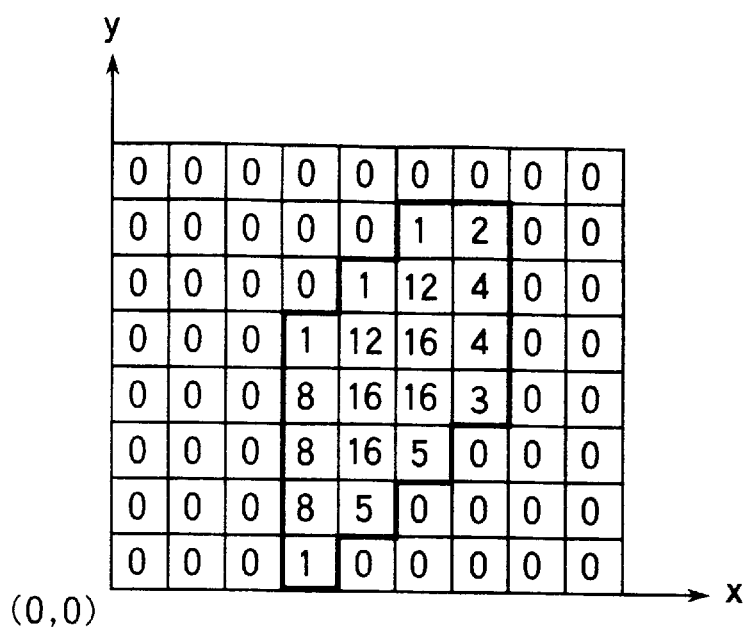
FIG. 5 is a view showing the bit pattern of the pattern shown in FIG. 4.

That is, this pattern based on the above condition is a parallelogram created on a pattern grid having a number of squares each divided into 4×4 segments as shown in FIG. 4. The result obtained by representing the parallelogram with 17 gray scale levels of 0 to 16 gray scale levels is shown in FIG. 5. That is, the periphery of the pattern is represented by the numeric values corresponding to the share of the squares and the middle section thereof by full gray scale level, i.e., 16 gray scale level. In other words, the share of the pattern in each pattern grid is reflected on the created pattern result.

A multivalue data generation method will be described in detail. In converting one pattern grid value into one of the 17 gray scale levels, when a pattern is created on a pattern grid, how much share it occupies the pattern grid is calculated, and the calculation result is defined as the corresponding pattern grid value. In this case, in multivalue conversion, the specific position of each vertex of a pattern in the pattern grid is obtained with a precision ¼ the pattern grid. This value can be obtained when the origin (X, Y) of a rectangle as the pattern and its horizontal and vertical lengths L1 and L2, or the origin (X, Y) of a triangle as the pattern and its horizontal length L1 are obtained with a precision ¼ the pattern grid. Since the design grid size has a precision ¼ the pattern grid size, each vertex of each pattern can be calculated. Basically, when X, Y, L1, and L2 for a rectangle, and X, Y, and L1 for a triangle are determined, each vertex position of a pattern in the pattern grid is determined, and the values of the pattern grids around the pattern are uniquely determined. The value of each square inside the pattern except for the edge of the pattern is 16, as a matter of course. The multivalue data generation circuit used in the pattern data generating apparatus of the present invention can be realized using such characteristics.

Figure 6:
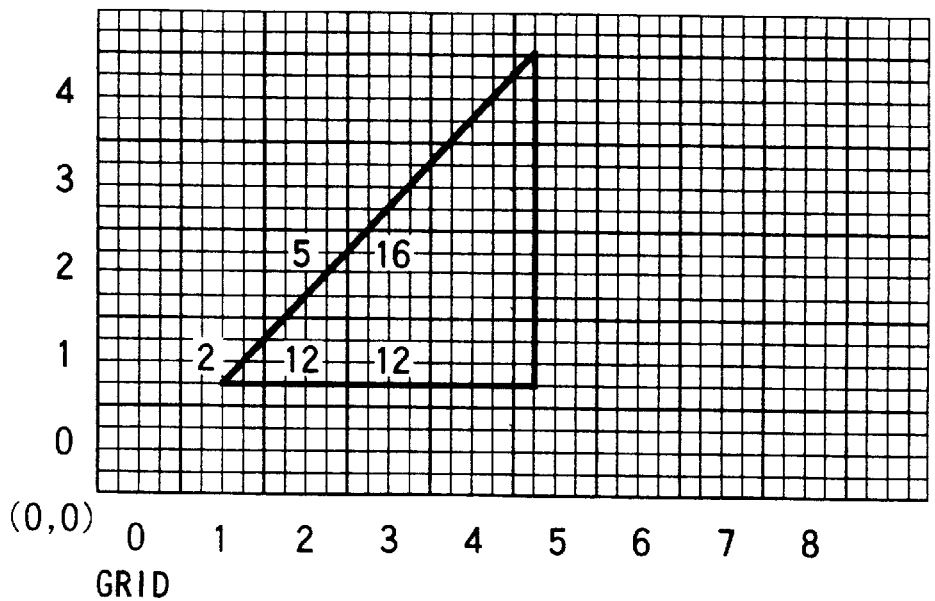
FIG. 6 is a view showing another pattern used in pattern generation.

For example, as shown in FIG. 6, for a triangle having a pattern code of 1, the origin (X, Y) of the pattern, and the length L1 of the pattern are given in development size as follows:

$$X=1\tfrac{2}{4},\ Y=1\tfrac{1}{4},\ L1=3\tfrac{3}{4},$$

The result of the above equations is shown in FIG. 7. In this case, the origin of the pattern has coordinates (²⁄₄, ¼) in the pattern grid in which this pattern is present. The value of the pattern grid (1, 1) in which the origin of this pattern is present is uniquely determined as "2" on the basis of only the type of pattern and the origin coordinates (a share of two squares out of 16 squares). The value of the pattern grid (2, 1) to the right of the grid of the pattern origin is "12", the upper right pattern grid (2, 2) has a value of "5". The value at the right end of the pattern is uniquely determined because the position and the pattern length in the pattern grid on the pattern origin are determined with a precision ¼ the pattern grid size.

As described above, as for the positions of the pattern origin (X, Y) and the pattern length L1 of a triangle having a shape in FIG. 6 in one pattern grid, four positions, i.e., ⁰⁄₄, ¼, ²⁄₄, and ¾ smaller than the pattern grid size are possible for each of the X, Y, and L1. That is, only 64 (=4³) combinations are possible. Similarly, for a quadrangle, 256 (=4⁴) combinations are possible. In practice, processing for a pattern having a size smaller than one pattern grid must be performed, and such processing is more complicated.

More specifically, when a pattern is small, e.g., when a triangle having a pattern code of 1 has the pattern origin (X, Y) and the pattern length L1 in the pattern grid size as follows, the result is shown in FIG. 8.

$$X=1\tfrac{2}{4},\ Y=1\tfrac{1}{4},\ L1=1\tfrac{1}{4}$$

In this case, the logic that the value of the lower left pattern grid (1, 1) in which the pattern origin exists is "2" is similar to the case of FIG. 6. However, the logic of the case of FIG. 6 that the value of the grid (2, 1) next to the grid (1, 1) is "12" and the value of the grid (2, 2) is "5" does not hold good in the case of FIG. 8. This is based on the following reasons. The values of the pattern grids on the second left column of the grid in which the pattern is present are supposed to depend on only the specific positions of the pattern origin in the pattern grid in which the pattern origin is present. However, since the pattern is small, the values of the above pattern grids are so determined as to receive the influence of a line segment at the right end. For this reason, a small pattern must be separately processed.

In the multivalue conversion method of the present invention, when a pattern like the one shown in FIG. 9 crosses in a given pattern grid, the theoretical values of the pattern grid coordinates (3, 2) and (4, 3) (i.e,. the pattern grids represented by positions 22 and 23 in FIG. 9) can be generated as "8". This pattern grid has six squares 100% shared by the pattern, and four squares 50% shared by the pattern since the pattern is inclined to cross the squares. For this reason, the theoretical value becomes 6+4*0.5=8. When conventional development using "1" and "0" is performed, "0.5" cannot be described, and the actual value is given as follows.

If 0.5 is rounded up, 6+4*1=10
If 0.5 is chopped, 6+4*0=6

In either case, the value deviated from the theoretical value "8" is obtained. The multivalue conversion method of the present invention can solve the conventional problem.

As described in Jpn. Pat. Appln. KOKAI Publication No. 1-305344, when the pattern grid is set using a rectangular equilateral triangle so as to include an inclined line, the above conventional problem can be solved, but this method is not practical in view of the processing speed.

The second embodiment will be described below. To process a pattern like one shown in FIG. 2, a basic pattern shown in FIG. 11 is prepared, and other patterns are divided into basic patterns and processed. In actual pattern development processing, m pattern grids in the Y-axis direction (vertical direction) are defined as one word (m and n are appropriate integers), and rendering is performed in the X-axis direction (horizontal direction) while simultaneously processing n words. For the descriptive convenience, the basic pattern is selected as shown in FIG. 11. When a processing sequence for this basic pattern is prepared to allow development of all the patterns. For example, a parallelogram shown in FIG. 12 is divided into two rectangular equilateral triangles and one rectangle, which are then processed. The development direction can be reversed with respect to the X-axis for a pattern symmetrical about the Y-axis. Processing sequences may be prepared for all possible patterns, but the basic pattern is preferably prepared to improve the hardware apparatus.

The pattern processing of the present invention can be realized by a table reference method in which limited patterns are written in a ROM or the like in advance. The hardware arrangement for realizing this table reference method is shown in FIG. 10.

Figures 10, 14:
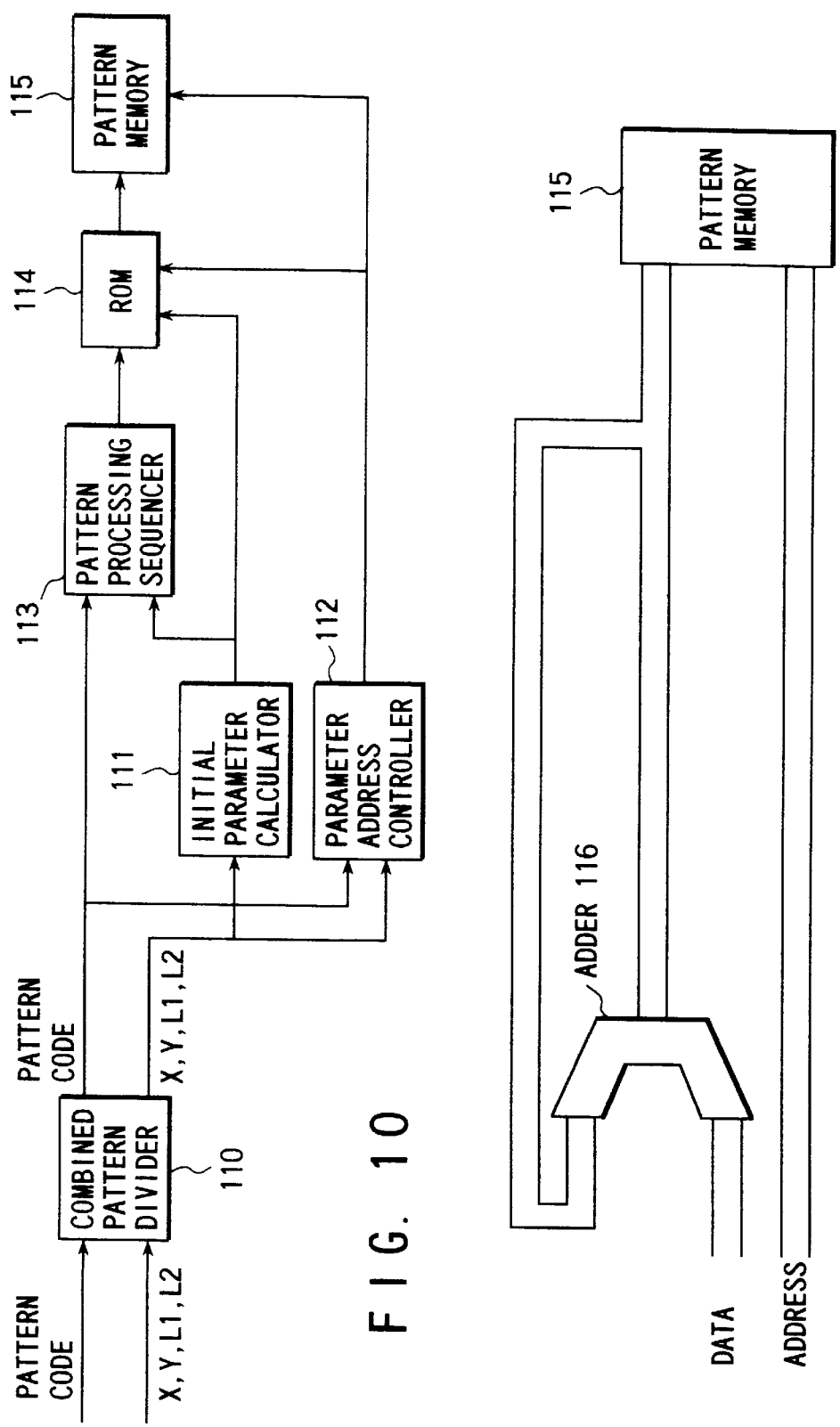
FIG. 10 is a block diagram showing the hardware arrangement of the pattern data generating apparatus of the present invention.
FIG. 14 is a block diagram showing an arrangement of a circuit for writing pattern data in a pattern memory.

In the pattern data generating circuit shown in FIG. 10, a pattern code, pattern origin coordinates X and Y, and pattern lengths L1 and L2 are input to a combined pattern divider 110. This combined pattern divider 110 divides a pattern corresponding to the input pattern code into basic patterns. The pattern origin coordinates X and Y and the pattern lengths L1 and L2 input through the combined pattern divider 110 are input to an initial parameter calculator 111 and a parameter address controller 112. The parameter address controller 112 receives the pattern code together with the pattern origin coordinates X and Y and the pattern lengths L1 and L2 and performs pattern parameter addressing.

A pattern processing sequencer 113 receives the pattern code from the combined pattern divider 110 and the initial parameters from the initial parameter calculator 111 and executes a pattern processing sequence. In other words, the initial parameter is calculated using an input pattern, and then it is determined by the initial parameter that what address of the ROM 114 should be accessed. Thereafter, multivalue pattern data is written in the pattern memory 115. The multivalue pattern data is read out, as needed.

The third embodiment will be described wherein the patterns generated in the first and second embodiments are written in the memory.

In pattern processing of the present invention, since the generated multivalue pattern data is stored in the pattern memory, a plurality of patterns may be present in a single pattern grid. As shown in FIG. 14, the data written in the pattern memory 115 must be read out once, the readout data must be added to the readout data by an adder 116, and the sum must be written in the pattern memory 115 again.

Figure 15:
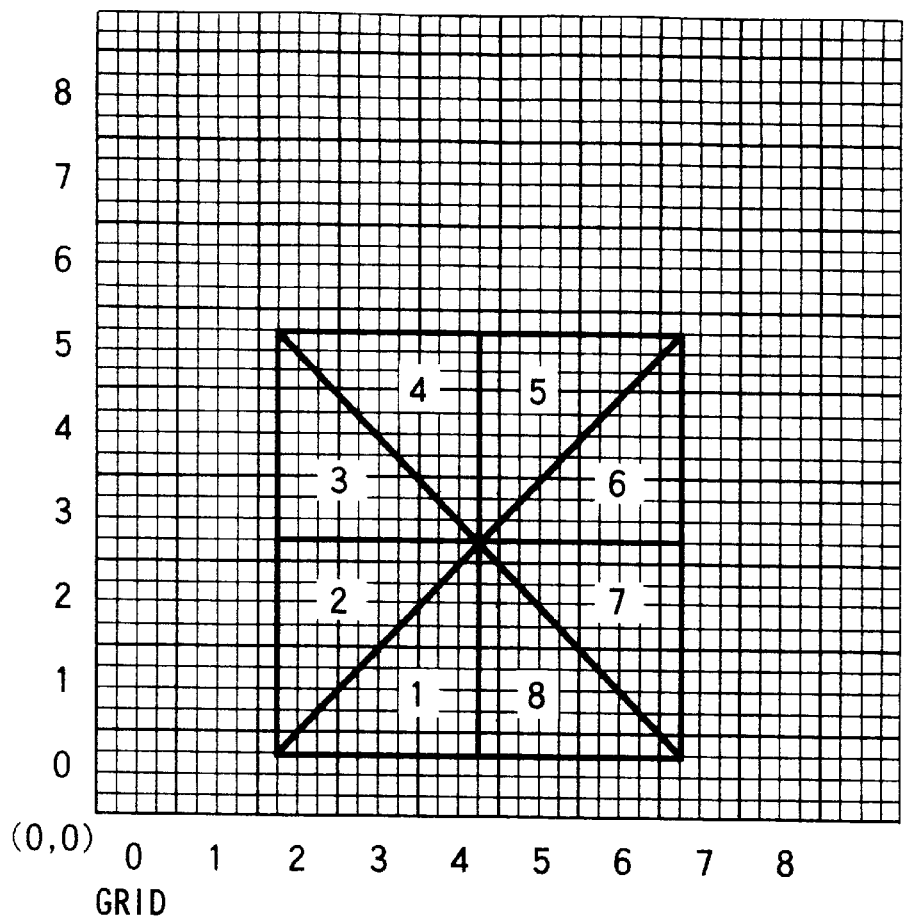
FIG. 15 is a view showing a pattern obtained by combining a plurality of patterns.

Multivalue conversion has been considered using 17 gray scale levels. For a square (FIG. 15) obtained by combining eight triangles, the value of the central pattern grid ((4, 3) in FIG. 15) may take any one of the values of 16 to 20 depending on the position of the coordinates of the central portion of the square in the pattern grids. The value of the central pattern grid in FIG. 15 is "20". This problem can be solved when any value of 16 or more is regarded as 16. Under this condition, the value of each of the four corners of the above square becomes larger than the initially expected value by one depending on the position in the pattern grid. The pattern grid coordinates (2, 0) of the pattern in FIG. 15 are supposed to have a value of "3". However, "3" is obtained for pattern No. 1, "1" is obtained for pattern No. 2, and the total value of the two patterns is given as "4" due to the following reason. Each pattern is supposed to have a value of 0.5, but this value is rounded up to "1". When this operation is performed for two or more patterns, the above phenomenon occurs. To prevent the phenomenon a value becomes larger than an initially expected value, the internal precision is improved to allow processing of a value of 0.5. Under this condition, even in the pattern grid (2, 0) in FIG. 15, the values of patterns Nos. 1 and 2 are given as 2.5 and 0.5, respectively, and a theoretical value as the sum "3" can be obtained. In this case, the value of each pattern is represented by 6 bits, for example, and when the last bit of the 6 bits is 1, it represents 0.5, while when it is 0, it represents 0. Accordingly, the value "2.5" of the pattern is represented by 00101. If the value is "2", it is represented by 00100.

The fourth embodiment will be described wherein the pattern data generated in the first and second embodiments are read out from a pattern memory 115.

A pattern is written in the pattern memory 115 and read out, and then a new pattern is written in the pattern memory 115. For this reason, when the pattern is read out, the pattern memory 115 must be cleared. After the pattern is read out, null data representing the absence of the pattern is written in the pattern memory 115.

Figure 16:
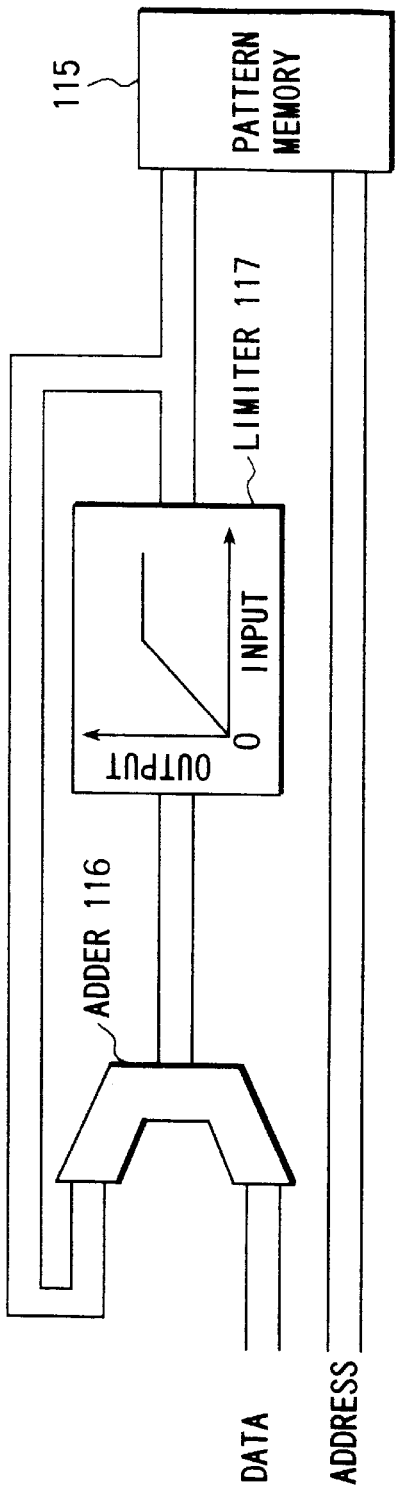
FIG. 16 is a block diagram showing another arrangement of a circuit for writing the pattern data in the pattern memory.

The fifth embodiment exemplifies that patterns overlap each other. A circuit for limiting the amplitude of an excess portion when the value of a pattern grid exceeds an upper limit value, that is, a limiter 117 is added, as shown in FIG. 16, to solve the pattern overlapping problem.

In other words, according to this embodiment, when the data obtained by adding new data to the data read out from the pattern memory 115 exceeds over the upper limit of pattern grid, i.e., 16, the upper value of the addition data is limited to 16 by the limiter 117.

Figure 17:
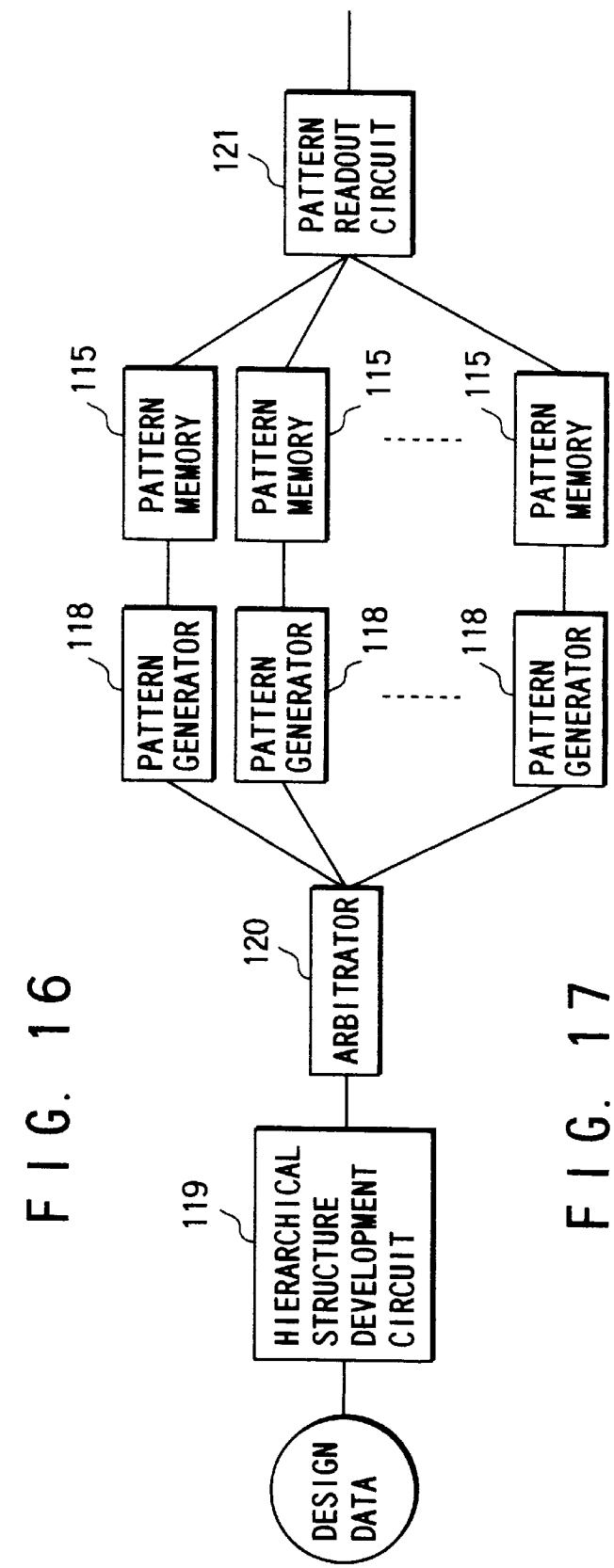
FIG. 17 is a block diagram for explaining a circuit for generating a pattern in accordance with parallel processing.

In the sixth embodiment, to increase a pattern generation speed, a plurality of pattern generators 118 and a plurality of pattern memories 115 are prepared, as shown in FIG. 17, and are operated in parallel. In this case, a data distribution arbitrator 120 distributes pattern data developed to data of each pattern by the hierarchical structure development circuit 119 to the plurality of pattern generators 118 to allow them to efficiently perform the parallel operation. The data stored in the pattern memory 115 is read out by a pattern readout circuit 121.

Figure 18:
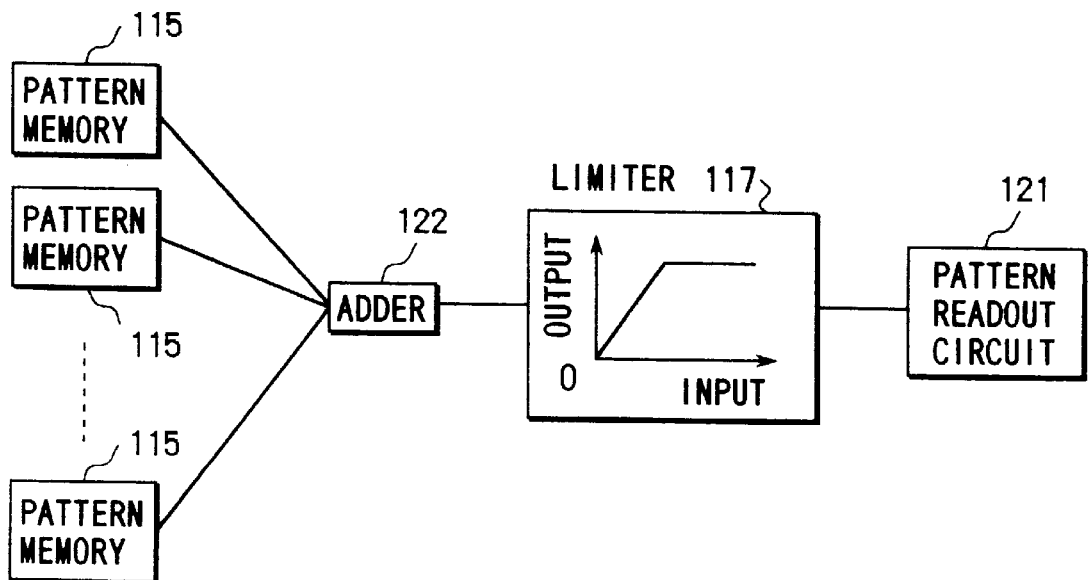
FIG. 18 is a block diagram showing an arrangement of a circuit for reading out pattern data from the pattern memory.

The seventh embodiment will be described wherein a plurality of pattern generators 118 are prepared. According to the embodiment, when the pattern data are read out, the pattern data on the identical coordinate are added to one another. In this case, a limiter 117 for limiting the amplitude of an excess portion when the sum exceeds a predetermined threshold value, as described in the embodiment of FIG. 16, is connected to the output of an adder 122, as shown in FIG. 18. In other words, when the addition value of the pattern data in each pattern grid exceeds over the upper limit of the pattern grid, i.e., 16, the upper value of the addition data is limited to the upper value of the pattern grid. As a result, the problem caused by the superposing of patterns is solved as described in the fifth embodiment.

In the above embodiment, design data is developed not into "1" or "0", but a multivalue gray scale level, so that a high-speed, high-precision can be sent to a subsequent circuit, thereby improving the performance of the inspection machine as a whole.

A method of generating multivalue data in the above embodiment will be described as the eighth embodiment.

Figure 19:
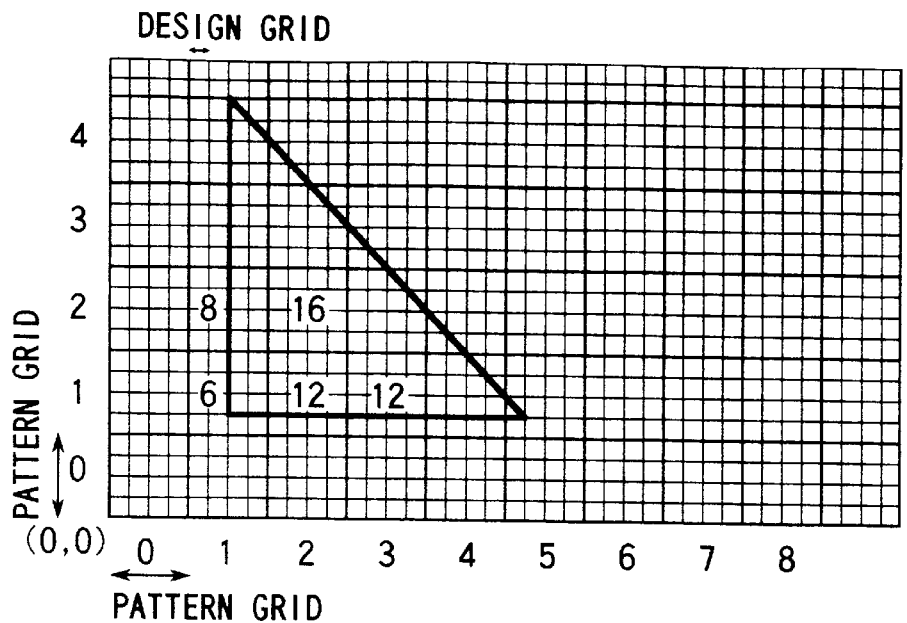
FIG. 19 is a view showing a pattern for pattern generation so as to explain a method of generating multivalue data in the present invention.

Assume that a pattern whose pattern code is 2 is a triangle, and a pattern origin (X, Y) and a pattern length L1 (=L2) are given in the pattern grid size as follows, as shown in FIG. 19:

X=1.50, Y=1.25, L1=3.75

Figure 20:
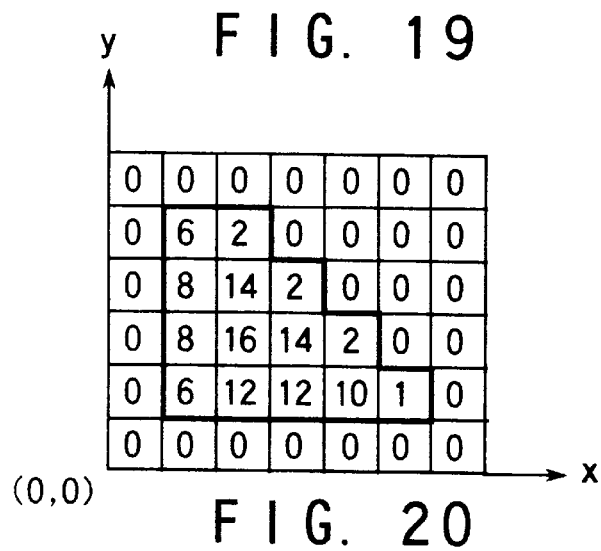
FIG. 20 is a view showing the bit pattern of the pattern shown in FIG. 19.

In this case, the result of the above condition is shown in FIG. 20. The origin of the pattern is located at a position (²⁄₄, ¼) in the pattern grid in which the origin is present. The value of the pattern grid (1, 1) in which the pattern origin is present is uniquely determined as "6" in accordance with only the type of pattern and the coordinates of the origin (i.e., a share of six squares out of 16 squares). The value of the immediately upper pattern grid (1, 2) and the left pattern grid (2, 1) of the grid in which the origin is present are also uniquely determined as "8" and "12", respectively. The value at the right end of the pattern can be uniquely determined because the position of the pattern origin and the pattern length in the pattern grid are known as ¼ the pattern grid size. The grid value on a line segment for forming a pattern is determined only by the decimal part of the values of the pattern origin and the pattern size. In practice, however, a pattern having a size smaller than one pattern grid must also be processed, so that processing becomes more complicated.

Figure 21:
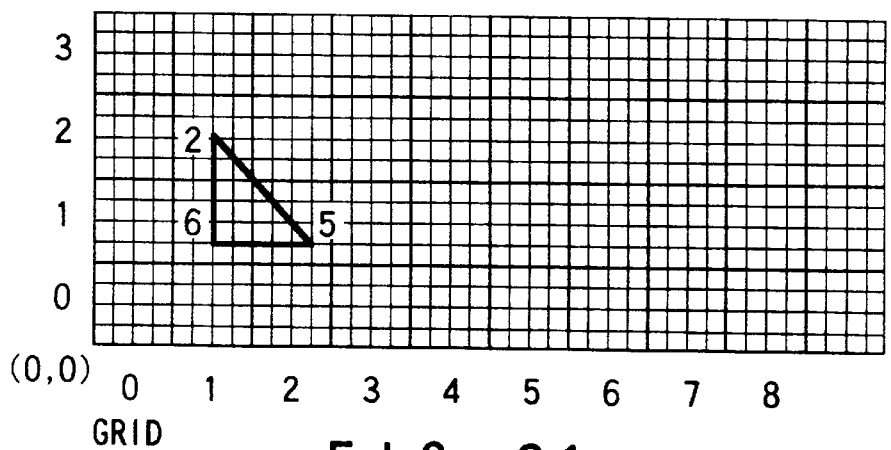
FIG. 21 is a view showing another pattern for pattern generation so as to explain a method of generating multi-value data in the present invention.

More specifically, when a pattern is small, e.g., when a triangle having a pattern code of 2 has the pattern origin (X, Y) and the pattern length L1 in the pattern grid size as follows, the result is shown in FIG. 21.

X=1.50, Y=1.25, L1=1.25

In this case, the theory that the value of the lower left pattern grid (1, 1) of the pattern origin is "16" is similar to FIG. 20. However, the theory that the value of the pattern grid (1, 2) next to the grid (1, 1) is "8" and the value of the grid (1, 2) is "12" does not hold good. For this reason, a small pattern must be separately processed.

The ninth embodiment exemplifies a specimen inspection machine for comparing pattern design data used to form a pattern with actual measurement data to detect pattern defects.

Figures 23A, 23B:
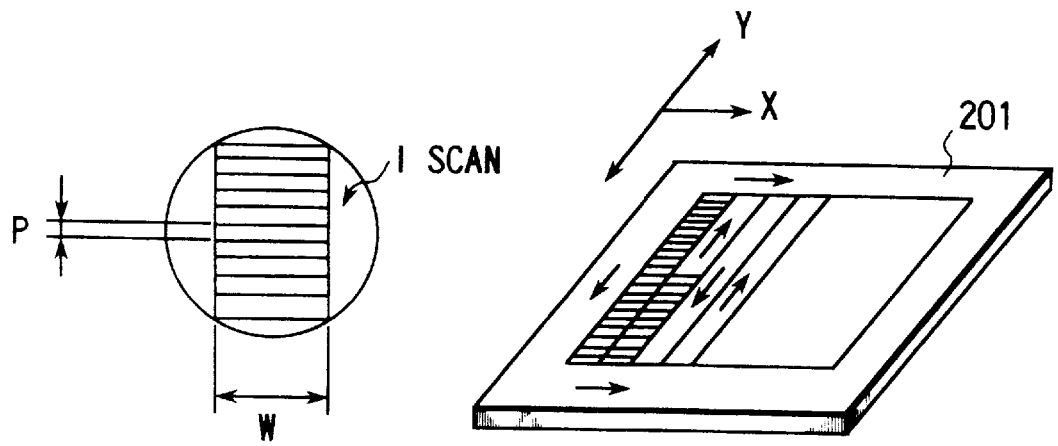
FIGS. 23A and 23B are views for explaining an inspection method in the pattern inspection machine.

In the specimen inspection machine shown in FIG. 22, a pattern formed on a photomask 201 is enlarged with a microscope or the like, and the enlarged pattern is divided into elongated stripes, as shown in FIG. 23. The divided portions are continuously scanned while, e.g., a table 202 is moved. The defects are then inspected in accordance with the data obtained by this scanning.

More specifically, the photomask 201 is placed on the X-Y-θ table 202, and the pattern formed on the photomask 201 is irradiated with an appropriate light source 203. Light passing through the photomask 201 is incident on a photodiode array 205 through an enlargement optical system 204. The optical image of the pattern is formed on the photodiode array 205. The pattern image formed on the photodiode array 205 is photoelectrically converted by the photodiode array and then A/D-converted by a sensor 206. Measurement pattern data output from the sensor 206 is sent to a comparator 208 together with data which is output from a positioning circuit 207 and represents the position of the photomask 201 on the X-Y-θ table 2.

On the other hand, pattern design data formed in forming the pattern on the photomask 201 in a manner to be described later is stored in a magnetic disk 209. The pattern design data is read out from the magnetic disk 209 to a pattern development and generation circuit 211 through a computer 210. In this case, the pattern development and generation circuit 211 develops the data in accordance with a technique to be describe later and sends the developed data to the comparator section 208. The comparator section 208 performs appropriate filtering processing for the input pattern data. This filtering processing is performed for the design data to match with the measurement pattern data because the measurement pattern data obtained from the sensor 206 is set in a filtered state in accordance with the resolution characteristics of the enlargement optical system 204 and the aperture effect of the photodiode array 205. The comparator section 208 compares the measurement pattern data with the design data having undergone the appropriate filtering processing. If no coincidence is established, the presence of a defect is determined.

Figure 24:
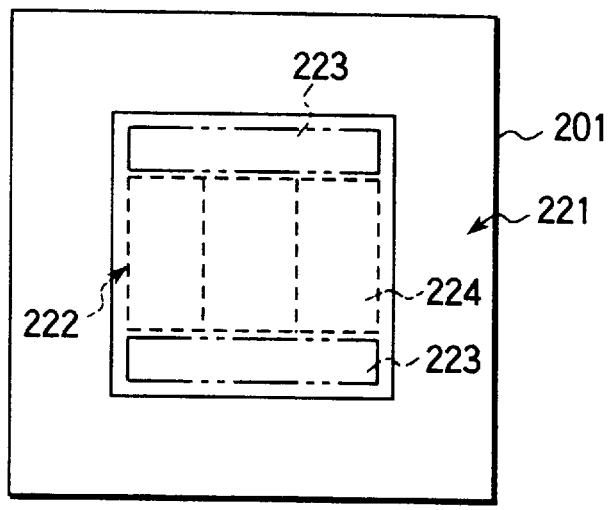
FIG. 24 is a view for explaining a pattern formation region on a photomask.
Figures 25A, 25B:
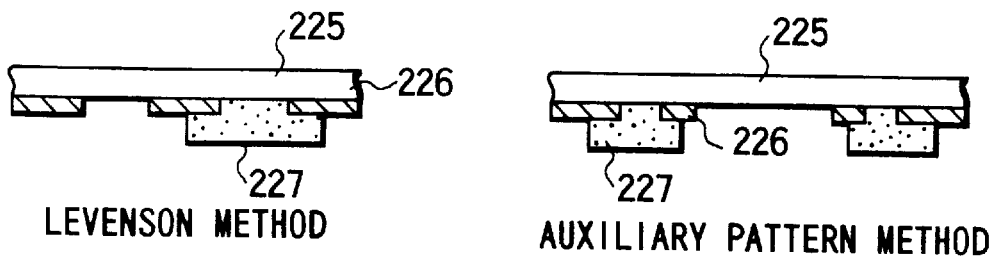
FIGS. 25A to 25E are views for explaining the various structures of a phase shift mask.
Figure 25C:
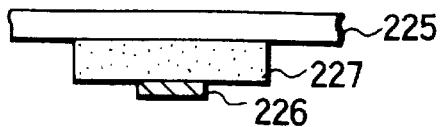
Figure 25D:
Figure 25E:
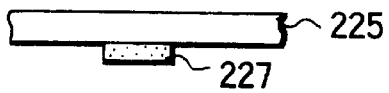

In the specimen inspection machine described above, a phase shift pattern using light interference is formed on the photomask in order to increase the resolution of an optical transfer apparatus along with the development of LSIs having a high integration degree. More specifically, the pattern formed on the photomask 201 is divided into a peripheral pattern 221 and a circuit pattern 222, as shown in FIG. 24. The circuit pattern 222 is further divided into a logic controller 223 and a memory 224. The memory 224 particularly requires micropatterning, and the phase shift pattern must be formed on a photomask portion corresponding to the memory 224. A normal photomask is obtained by forming, on a glass substrate, a predetermined pattern constituted by a chromium layer having light shield function (this pattern is called a chromium pattern hereinafter). The phase shift pattern is normally formed of a light shield material such as $SiO_2$. Various structures are assumed for a phase shift pattern. Examples of the phase shift scheme are a Levenson scheme shown in FIG. 25A, an auxiliary pattern scheme in FIG. 25B, an edge emphasis scheme in FIG. 25C, a no-chromium scheme in FIG. 25D, and a halftone scheme in FIG. 25E. FIGS. 25A to 25E show a glass substrate 225, a chromium pattern 226, and a phase shift pattern 227. The pattern data stored in the magnetic disk 209 and the data development/generation circuit 211 are improved in the present invention so as to allow simultaneous detection of a chromium pattern and a phase shift pattern for a specimen such as a photomask having both chromium and phase shift patterns.

Figure 26:
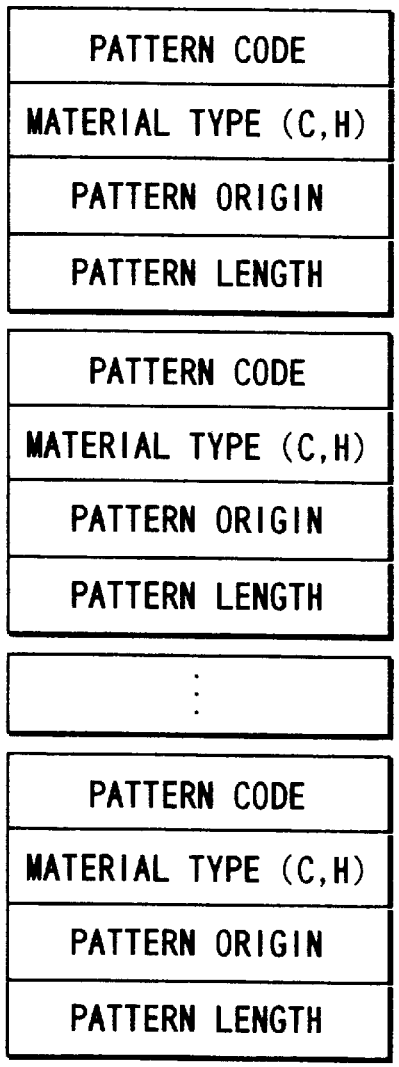
FIG. 26 is a view showing pattern data stored in a magnetic disk.

More specifically, pattern design data used to form the chromium patterns 226 and the phase shift patterns 227 on the photomasks 201, as shown in FIGS. 25A to 25E, are stored in the magnetic disk 209 so as to define the pattern design data on the same coordinate system. As shown in FIG. 26, in addition to a pattern origin and the side length of a pattern, the pattern design data includes pattern data representing the phase shift pattern 227, such as identification data defining the presence/absence and type of a phase shift pattern and attribute data for designating the operation mode of the development/generation circuit 211. The set values and algorithms necessary for inspections for only the chromium pattern 226, only the phase shift pattern 227, and both the chromium and phase shift patterns 226 and 227 are automatically changed. This change method is as follows. The change is automatically made when the data development/generation circuit 211 reads the above attribute data or when the computer for controlling the data development/generation circuit 211 or the computer having the magnetic disk 209 reads data and sets the mode as a command to the data development/generation circuit 211.

Data are transferred from the magnetic disk 209 to the data development/generation circuit 211 in units of stripes or an appropriate region called a cell. The data development/generation circuit 211 develops the transferred data in accordance with the hierarchical structure of data, stores the developed data in a pattern memory to be described later, reads out the data from the pattern memory with the progress of the inspection, and outputs the readout data to a subsequent circuit.

Semiconductor design data of this type serving as a target of the present invention generally employs an appropriate hierarchical structure in order to efficiently describe repetition patterns and common layout patterns. In this case, various modes are assumed for mixing of chromium and phase shift patterns. As the simplest example, the chromium pattern and the phase shift pattern are stored in the magnetic disk 209 as perfectly separate files.

Figure 27:
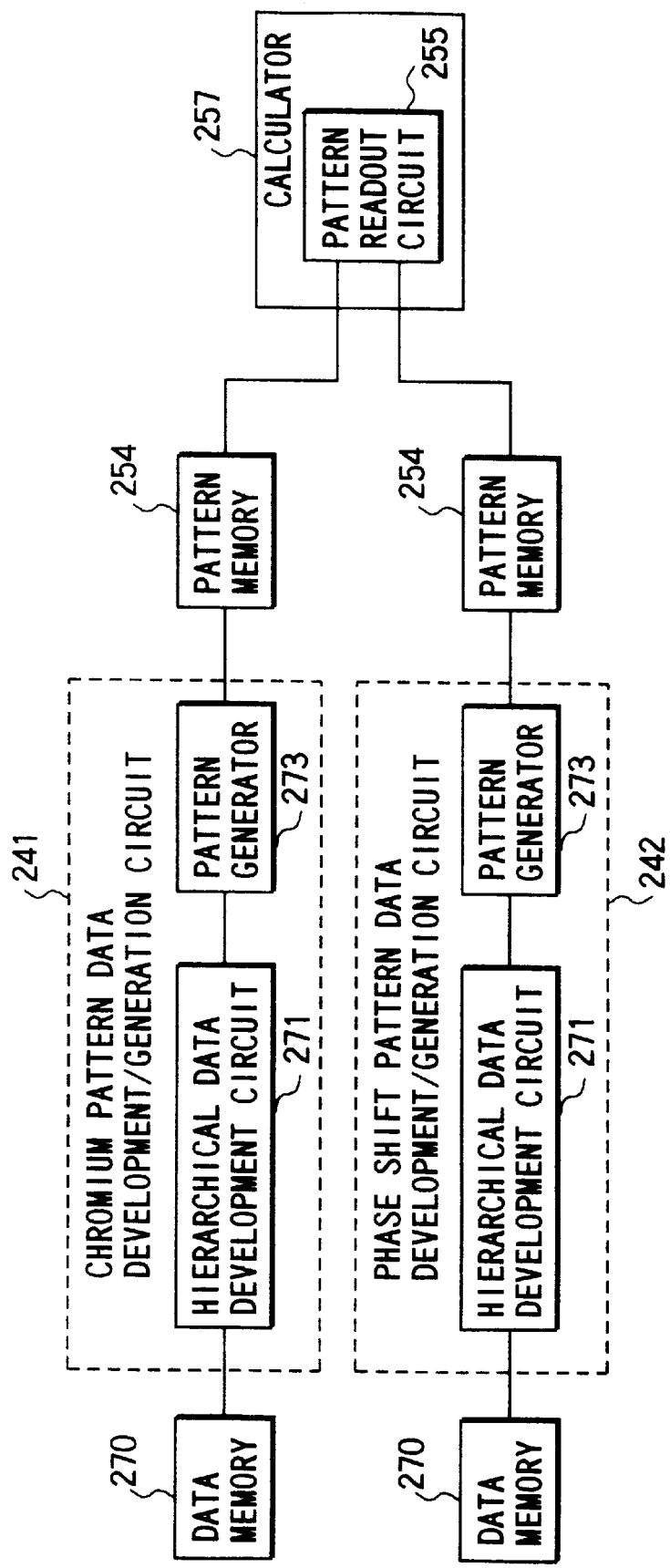
FIG. 27 is a block diagram showing the arrangement of a pattern inspection machine using a scheme of synthesizing a chromium pattern and a phase shift pattern.

According to the present invention, various inspection schemes of the specimen inspection machine will be described. According to the first scheme, as shown in FIG. 27, a chromium pattern data development/generation circuit 241 and a phase shift pattern data development/generation circuit 242 are arranged, and the computer performs the above identification in processing the files. The computer transfers the corresponding files to the respective circuits and performs processing.

More specifically, referring to FIG. 27, a data memory 270 corresponding to the chromium pattern data development/generation circuit 241 serves as a buffer for temporarily storing the transfer data from the computer 210. A hierarchical development circuit 271 reads out data from the data memory 270, develops the hierarchical structure of the data, and outputs the developed data to a pattern generator 272 for generating a multivalue level bit pattern. The multivalue bit pattern data generated by the pattern generator 272 is stored in a pattern memory 254. The pattern memory 254 has a ring buffer structure and is arranged to sequentially perform development in synchronism with the read access of a pattern readout circuit 255. The buffer size is assured enough to hold a predetermined pattern range for absorbing variations in development rate which are caused by the pattern density of the development pattern.

The phase shift pattern data development/generation circuit 242 is characterized in that a bit pattern generator 273 for generating a multivalue level bit pattern has amplitude characteristics different from those of the chromium pattern data development/generation circuit 241. That is, the chromium pattern takes an amplitude falling within the range of 0 to 100, and the halftone film takes an amplitude of 70.

More specifically, in the chromium pattern data development/generation circuit 241, data describing a portion of the glass substrate 225 which is exposed to the chromium pattern 226 is developed in the pattern memory 254, as shown in FIGS. 28A and 28B, so that the glass pattern portion has a value "100", and the chromium pattern portion has a value "0". In the phase shift pattern data development/generation circuit 242, data describing the phase shift pattern 227 formed on the chromium pattern 226 shown in FIGS. 28A and 28B is developed in the pattern memory 254, so that the half-tone film portion has a value "−30", and the glass pattern portion has a value "0". The bit pattern generators 272 and 273 of both the development/generation circuits have a function of generating an appropriate halftone value corresponding to a pattern edge or a pattern corner so as to suppress the quantization error of the pattern edge.

The pattern readout circuit 255 performs read access to the chromium pattern memory 254 and the phase shift pattern memory 254 so as to synchronize the coordinates. At this time, the following calculation is performed in a calculator 257. The phase shift data of a recessed phase shift mask will be exemplified with reference to FIGS. 29A to 29E.

In this recessed mask, after a shifter is adhered to chromium, a glass portion exposed from the chromium and shifter is recessed, and the shifter is removed, thereby completing the process.

Referring to FIGS. 29A to 29E, the original glass portion and the recessed portion are made of glass. For this reason, when light is incident on this photomask, the amount of light passing through the original glass portion is supposed to be basically equal to that through the recessed portion while changing the phases. However, when light having a wavelength different from the original exposure wavelength is used to conduct an inspection, the above assumption cannot be established when the pattern interval is very small. It is found that the amplitude of light passing through the recessed portion is slightly smaller than that through the original glass portion. The following processing is performed to cope with such phase shift data. That is, the calculator 257 subtracts the phase shift pattern data from the chromium pattern data. In this case, letting d1, d2, k1, and k2 be the chromium data, the phase shift data, and appropriate coefficients so as to obtain an appropriate amplitude result, the following difference is calculated:

$$k1d1 - k2d2$$

When the difference is a negative value, a function of clamping the result to zero is also provided. In the above calculation, desired characteristics can be obtained.

Write access to the pattern memories becomes practical by employing the arrangement shown in FIG. 14 described above. That is, data in a pattern memory coordinate area to which new data is to be written is read out once, the readout data is added to the new data, and the sum is written in the memory. This is because an actual pattern memory is easily arranged to simultaneously process a plurality of pixels.

When patterns overlap each other, the amplitude of the glass pattern portion exceeds "100" in the arrangement of FIG. 14. The pattern overlapping problem can be solved by adding the circuit for limiting the amplitude of an excess portion, as shown in FIG. 16.

Write access of the bit pattern generators 272 and 273 to the pattern memories 254 is designed to have a high speed enough to cope with the predetermined inspection speed of the inspection machine. That is, the pattern readout circuit 255 operates to wait for a data request from the subsequent comparator 208, the patterns are developed in the pattern memories 254 so as to operate in the full ring buffer state. Each pattern memory 254 has a function of clearing the contents to zero upon read access because data becomes unnecessary upon read access.

The data synthesized and read out in the above process is sent to the comparator 208. The comparator 208 performs appropriate filtering processing for the input data and converts it into detailed multivalue data. The comparator 208 compares with the multivalue data with the observation data sent from the sensor 206 in accordance with a comparison determination algorithm, thereby determining a defect. Note that a more practical arrangement is made such that sensor characteristics are corrected between the sensor 206 and the comparator 208, and offset processing and clamping processing corresponding to processing of the above design data can be performed.

In the above description, as the mode of mixing of the chromium pattern data and the phase shift pattern data, these data are stored in the magnetic disk 209 as the perfectly separate files. However, to describe the repetition patterns and common layout patterns as described above, processing for allowing mixing of the chromium and phase shift patterns in an appropriate layer of a hierarchical structure may be regarded as a practical method.

The data development/generation circuit 211 of the present invention basically has a pipelined circuit arrangement of coarse and fine development operations which has an input/output interface for each data description layer. When the number of layers increases, the number of circuit arrangements is increased accordingly.

In this case, it is assumed that chromium pattern data and the phase shift pattern data are separately described in the nth or lower layers, and the chromium and phase shift patterns are described to be processed as an integral structure.

A second inspection method of the present invention will be described with reference to FIG. 30 in which data as a mixed string of the chromium and phase shift pattern data flows up to the nth layer, and the mixed string is identified in the nth layer, while chromium pattern data circuits and phase shift pattern data circuits are arranged for a processing portion of less than nth layer to operate in parallel, thereby coping with a case in which the chromium pattern data and the phase shift pattern data are mixed in the magnetic disk 209 as a single file.

The data loaded in the inspection machine of the present invention can be identified such that "C" is assigned to a chromium pattern, and "H" is assigned to the halftone pattern in the format shown in FIG. 26, unlike the data format in FIG. 3. The above assignment is determined upon assuming the chromium-halftone mixed pattern having a sectional shape shown in FIGS. 28A and 28B.

A data identification circuit 251 in FIG. 30 is arranged for a portion for developing the nth layer. The identified hierarchical data is supplied to the chromium pattern generator 241 and the phase shift pattern 242 described with reference to the first inspection method. The subsequent operations, i.e., the write operation in the pattern memories, and the operations of the pattern memory readout circuit 255, and the calculator 257 are identical to those of the first inspection method.

In the second inspection method, when the chromium pattern data and the phase shift pattern data are mixed and their access frequencies are extremely different from each other, the circuit processing capacity for a higher access frequency determines the overall development speed although the circuit for data having a low access frequency is idle. For this reason, to efficiently operate the overall circuit, the chromium pattern data circuits and the phase shift pattern data circuits are eliminated, and an arrangement for processing both chromium and phase shift pattern data can be employed.

This arrangement is represented as the third inspection method in FIG. 31. According to this arrangement, a data memory 270 identifiably stores chromium pattern data and phase shift pattern data. For the data read out from the data memory, a chromium pattern and a halftone pattern are assigned with "C" and "H", respectively, in accordance with a format shown in FIG. 26, so that the identification circuit 251 identifies the patterns with these letters. An amplitude adjuster 252 determines the amplitude (brightness). The brightness is defined so that, for example, a chromium pattern takes a value falling within the range of 0 to 100, a chromium light shield film takes a value of 0, and a glass portion takes a value of 100. The brightness is defined so that a phase shift pattern takes a value falling within the range of −30 to 0, a halftone film portion takes a value of −30, and a glass portion takes a value of 0.

A pattern generator 253 generates data having the amplitude of a bit-developed result which is determined by the amplitude adjuster 252 and writes the amplitude data in a bit pattern memory 254. According to this method, the glass portion of the chromium-glass pattern has a value "100" and the halftone film portion of the phase shift mask has a value "−30". These values are stored in the pattern memory.

In writing data in the pattern memory, data in a memory area in which new data is to be written is read out once, the readout data is added to the new data, and the sum is written in the memory, as shown in FIG. 14, as in the first and second methods.

With this arrangement, a portion in which the light shield film of the phase shift pattern overlaps the chromium pattern (glass portion) takes a value "100", and then a value "−30" which are stored in the pattern memory. Since data "100" is read out when data "−30" is to be written in the memory, and the sum of "100" and "−30" is calculated, the sum "70" is finally written in the pattern memory. The write order may be reversed, and a negative value may be temporarily written in the pattern memory.

According to this method, patterns are generated for both the halftone and chromium portions and written in the memory. Even if the final cumulative value exceeds the upper limit value (100 in this case) or is smaller than the lower limit value (0 in this case), the pattern overlapping problem can be solved by adding the circuit for limiting the amplitude of the excess portion, as shown in FIG. 16.

In the bit pattern generator of the specimen inspection machine of the present invention, the throughput can be improved by operating in parallel, the pattern generators 118 and the pattern memories 115 shown in FIG. 17 described in the sixth embodiment, as compared with the data development circuit for developing data in accordance with a hierarchical structure because the processing time of a portion for generating respective patterns is long.

In this case, a data distribution arbitrator 120 for distributing input data so as to cause the plurality of pattern generators to perform parallel processing of the data developed for each pattern is arranged in the hierarchical structure development circuit.

The plurality of pattern generators 118 and the pattern memories 115 respectively corresponding to the pattern generators 118 can also be arranged to develop chromium and phase shift patterns in a mixed manner. As described in the second method with reference to FIG. 30, an appropriate number of chromium pattern generators 241 and an appropriate number of phase shift pattern generators 242 can be arranged, and the arbitrator 120 in FIG. 17 can also have a function of the data identification circuit 251 in FIG. 30.

The pattern readout circuit 121 of this method adds pattern data having identical coordinates in read access from the plurality of pattern memories 115 and reads out the sum. In practice, a combined function constituted by the calculator 122 and the limiter 117 shown in FIG. 18 is prepared. The calculator 122 adds the pattern data having identical coordinates, and the limiter 117 is a circuit for limiting an excess amplitude portion exceeding the predetermined amplitude, as described in the first method. This solves the pattern overlapping problem.

The fifth inspection method will be described below. In this method, as shown in FIGS. 32A to 32C, like the first and second phase shift films, the two types of phase shift films are mixed with a chromium film. The brightness of glass is "100", the brightness of the A-type phase shift film portion is "70", the brightness of the B-type phase shift film portion is "30", and the brightness of the chromium film is "0".

In the circuit arrangement in FIG. 31, the identification circuit 251 identifies the chromium film and the two types of phase shift films. The data identification circuit 251 outputs an instruction to the amplitude adjuster 252 such that a glass-chromium pattern has a value falling within the range of 0 to 100, the A-type phase shift film pattern takes a value falling within the range of −30 to 0, and the B-type phase shift film pattern takes a value falling within the range of −70 to 0.

The operations and arrangements of the subsequent pattern generator 253 and the subsequent pattern memory 254 are identical to those described with reference to the third method.

Note that three pattern generators may be prepared to realize a method as in the first and second methods. In the fifth method as well, a method of preparing in parallel the plurality of pattern generators and pattern memories respectively corresponding to the pattern generators and synthesizing the outputs in read access to the pattern memories, as described in the fourth method, can be employed.

In each inspection method described above, a large-capacity buffer may be arranged at a portion for receiving data from a computer. Alternatively, a plurality of buffers may be arranged to perform alternate inspections in accordance with the principle of double buffer. In addition, buffer memories may be arranged between the constituent circuits, offset values may be superposed on the pattern readout results, and the optical amplitude characteristics may be simulated with high precision. This is a practical modification as an application of the present invention.

In the above description, a specimen inspection machine allows observation upon transmitting light from a light source through a specimen. However, a data development/generation circuit of the present invention may employ a method of observing light reflected by a specimen. In this case, the dynamic range of amplitudes and the density is defined again, thereby applying the present invention thereto.

According to a pattern data generating apparatus of the present invention, as described above, design data is developed not into "1" or "0", but into multivalue gray scale level to allow transmission of high-precision development result to a subsequent circuit at a high speed. Therefore, the overall performance of the inspection machine can be improved.

According to a specimen inspection machine of the present invention, chromium pattern design data and phase shift pattern design data which are used to form a pattern on a photomask are used to simultaneously inspect the defects of the chromium and phase shift patterns. A phase shift mask does not have a structure in which a phase shift pattern is formed on the entire surface. The phase shift mask has a portion whose pattern line width is very small or a portion having a large number of repetition patterns. That is, one mask has a portion of only chromium patterns and a portion in which chromium and phase shift patterns are mixed. A change in inspection method can be spontaneously performed in accordance with whether phase shift pattern data is present in readout design data. Even a photomask having only chromium patterns or a photomask having only phase shift patterns can be independently inspected. In addition, an inspection algorithm matching a phase shift structure can be selected. Therefore, a more practical specimen inspection machine meeting various inspection requests can be realized by adding a minimum number of circuits.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A pattern data generating apparatus comprising:
    a storage configured to store a plurality of design pattern data prepared by a pattern designer and representing a design pattern; and
    a decoder configured to obtain a decoded figure having a figure shape, a figure position and a figure size from each of the design pattern data read out from said storage;
    a casting section configured to cast the decoded figure to a plurality of arrayed squares each having a predetermined size and divided into a plurality of segments arranged in a matrix;
    a computing section configured to compute occupation ratios defining how much of each square is occupied by the figure in relation to how many segments of each square are occupied by the figure; and
    an output section to output a plurality of gray scale level data representing 0 to n gray scale levels corresponding to the occupation ratios, respectively.

2. A pattern data generating apparatus according to claim 1, wherein said pattern generating section has means for outputting the pattern data read out from said storage as it is when the pattern shape represents a basic shape and dividing it into a plurality of generated pattern data when it represents a combination of the plurality of basic patterns.

3. A pattern data generating apparatus according to claim 1, which includes a pattern memory section configured to store the gray scale level data from said output section by a predetermined range, and a readout section configured to read out the gray scale level data from said memory section.

4. A pattern data generating apparatus according to claim 3, wherein said pattern generating section has means for outputting the pattern data read out from said storage as it is when the pattern shape represents a basic shape and dividing it into a plurality of generated pattern data when it represents a combination of the plurality of basic patterns and outputting it to said pattern memory.

5. A pattern data apparatus according to claim 3, wherein said readout section comprises a section configured to write null data representing the absence of a pattern in said storage simultaneously when the gray scale level data are read out from said storage.

6. A pattern data apparatus according to claim 3, further comprising an accumulative write section configured to read out the gray scale level data already present in the squares before new data is written in said pattern memory section, adding the readout gray scale level data and the new data to obtain sums, and writing the sums in the square.

7. A pattern data generating apparatus according to claim 6, wherein said cumulative write section has an upper limit clamp function of writing a predetermined threshold value when the sum exceeds the threshold value.

8. A pattern data generating apparatus according to claim 3, wherein said pattern generating section comprises a plurality of pattern generators for generating multivalue level bit pattern data, said pattern memory comprises a plurality of pattern memories respectively corresponding to said pattern generators, and which further comprises a data distribution arbitrator for distributing input data so as to cause said plurality of pattern generators to perform parallel processing, and a pattern data adder for, when said plurality of pattern memories are to be read-accessed, adding values of squares having identical coordinates to obtain a sum and outputting the sum to said readout section.

9. A pattern data generating apparatus according to claim 8, wherein said pattern data adder has an upper limit clamp function of outputting a predetermined threshold value to said readout section when the sum exceeds the predetermined threshold value.

10. A pattern data generating apparatus according to claim 3, wherein said pattern generating section comprises setting means for setting a size of a pattern grid including the squares to have an integer multiple of a size of a design grid corresponding to the design pattern.

11. A pattern data generating apparatus according to claim 10, wherein said setting means sets 4×4 pixels of the design grid as one pattern grid.

12. A method of generating a gray scale pattern represented in units of pixels comprising the steps of:
inputting pattern data including a pattern position and a pattern size at an accuracy of 1/n (n: integer) of a pixel, the pattern data representing a design pattern prepared by a pattern designer;
casting the design pattern to a plurality of arrayed squares each having a predetermined size and divided into a plurality of segments arranged in a matrix:
calculating occupation ratios defining how much of each square is occupied by the pattern data in relation to how many segments of each square are occupied by the pattern data; and
outputting a plurality of gray scale level data representing 0 to n gray scale levels corresponding to the occupation ratios.

13. A method according to claim 12, wherein the calculating step includes expressing each pixel in units of 0.5 gray scale level in calculating a gray scale level of the multivalue gray scale pattern data.

14. A method of generating a gray scale pattern represented in units of pixels comprising the steps of:
inputting pattern data including a figure having a pattern shape, a pattern position and a pattern size at an accuracy of at least 1/n (n: integer) of a pixel, when a pattern corresponding to the pattern data is formed of line segments extending in a X-direction, a Y-direction and an incline direction of 45°, the pattern data representing a design pattern prepared by a pattern designer;
casting the figure to a plurality of arrayed squares each having a predetermined pixel size and divided into a plurality of segments arranged in a matrix;
calculating occupation ratios defining how much of each square is occupied by the figure in relation to how many segments of each square are occupied by the figure; and
outputting a plurality of gray scale level data representing 0 to n gray scale levels corresponding to the occupation ratios, respectively.

15. A pattern inspection machine comprising:
an image acquisition section configured to irradiate light having an appropriate wavelength on a specimen on which a pattern is formed, and acquiring measurement data corresponding to a pattern image received by a photosensor;
a memory configured to store pattern design data used to form the pattern on the specimen, the pattern data representing a design pattern prepared by a pattern designer;
a data development/generation section configured to develop every pixel of the pattern design data read out from the memory; and
a determination section configured to compare data obtained by filtering the data developed by the data development section with the measurement pattern data, and determining the presence/absence of defect of the pattern formed on the specimen,
wherein the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, the phase shift pattern design data being multivalue data, and
said data development/generation section comprises a light shield pattern design data generation circuit and a phase shift pattern design data generation circuit, each of which comprises identification means for identifying a light shield pattern or a phase shift pattern on the basis of the light shield pattern design data and the phase shift pattern design data, amplitude adjusting means for determining an amplitude and offset of a brightness signal for each predetermined description unit on the basis of an identification signal from said identification means, pattern means for allowing bit weighting, inversion and a sign to be variable on the basis of the brightness signal from said amplitude adjustment means, a pattern memory for storing a predetermined pattern range of a bit string generated by said pattern means, pattern memory readout means for performing sequential read access to said pattern memory in accordance with an inspection progress, and calculation means for synthesizing data from said respective data generation circuits for each data type combination in accordance with a predetermined calculation method, and outputting a synthesis result.

16. An apparatus according to claim 15, wherein said calculation means calculates the data by the following relation:

$$k1d1+k2d2 \text{ for } 0<k1<1 \text{ and } -1<k2<1$$

where d1 is chromium data, d2 is phase shift data, and k1 and k2 are coefficients.

17. An apparatus according to claim 15, further comprising means for performing predetermined processing of data from said data generation means as the phase shift data to obtain a simulation development result of optical characteristics uniquely obtained in pattern observation of a phase shift mask, and outputting the development result to a subsequent circuit.

18. An apparatus according to claim 15, further comprising a write section for writing in said pattern memory a calculation result of the chromium pattern data read out from said pattern memory and newly developed phase shift pattern data, when a phase shift pattern is to be generated in said pattern memory after a chromium pattern is generated.

19. An apparatus according to claim 15, wherein said data development/generation section comprises a plurality of bit pattern generators and a plurality of pattern memories, and before a new bit string is written in said pattern memory, and performs a cumulative write method of reading out a bit string present at the same coordinates, adding the readout bit string and the new bit string to obtain a sum, and writing the sum in said pattern memory.

20. An apparatus according to claim 15, wherein said cumulative write means of said data development/generation section has an upper limit clamp function of writing a predetermined threshold value, when the sum exceeds the predetermined threshold value.

21. An apparatus according to claim 15, wherein said data development/generation section comprises a plurality of pattern generators and a plurality of pattern memories, and said specimen inspection machine further comprises data distribution arbitration means for distributing input data so as to cause said plurality of pattern generators to efficiently perform parallel processing, and pattern adding means for adding bit strings having identical coordinates to obtain a sum and outputting the sum to said pattern memory readout means, when said plurality of pattern memories are to be read-accessed.

22. An apparatus according to claim 21, wherein said bit pattern adding means has an upper limit clamp function of outputting a predetermined threshold value to said pattern memory readout means, when the sum exceeds predetermined threshold value.

23. A pattern data generating apparatus according to claim 1, wherein said pattern generating section outputs the multivalue occupancy data including multivalue data corresponding to a full gray scale level of a middle section of the design pattern and multivalue data corresponding to a non-full gray scale level of a periphery of the design pattern.

24. A pattern data generating apparatus comprising:
a storage configured to store design data;
a decoder configured to obtain a decoded figure having a figure shape, a figure position and a figure size from each of the design pattern data read out from said storage;
a casting section configured to cast the decoded figure to a plurality of arrayed squares each having a predetermined size and divided into a plurality of segments arranged in a matrix;
a computing section configured to compute occupation ratios defining how much of each square is occupied by the figure in relation to how many segments of each square are occupied by the figure; and
an output section to output a plurality of gray scale level data representing 0 to n gray scale levels corresponding to the occupation ratios, respectively;
a pattern memory section configured to store the gray scale level data from said output section by a predetermined range; and
a readout section configured to read out the gray scale level data of each of the squares from said pattern memory section, and
wherein said output section comprises a plurality of pattern generators for generating the gray scale level data, said pattern memory comprises a plurality of pattern memories respectively corresponding to said pattern generators, and which further comprises a data distribution arbitrator for distributing input data so as to cause said plurality of pattern generators to perform parallel processing, and a pattern data adder for, in read accessing of said plurality of pattern memories, adding values of squares having identical coordinates to obtain a sum and outputting the sum to said readout section.

25. A pattern data generating apparatus according to claim 24, wherein said pattern data adder has an upper limit clamp function of outputting a predetermined threshold value to said readout section when the sum exceeds the predetermined threshold value.

26. A pattern inspection machine comprising:
an image acquisition section configured to irradiate light having an appropriate wavelength on a specimen on which a pattern is formed, and acquire measurement data corresponding to a pattern image received by a photosensor;
a memory configured to store pattern design data used to form the pattern on the specimen;
a data development/generation section configured to develop every pixel of the pattern design data read out from the memory; and
a determination section configured to compare data obtained by filtering the data developed by the data development section with the measurement pattern data, and determine the presence/absence of a defect of the pattern formed on the specimen,
wherein the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, and
said data development/generation section comprises a light shield pattern design data generation circuit and a phase shift pattern design data generation circuit, each of which comprises identification means for identifying the light shield pattern or the phase shift pattern, amplitude adjusting means for determining an amplitude and offset of a brightness signal for each predetermined description unit on the basis of an identification signal from said identification means, pattern means for allowing bit weighting, inversion and a sign to be variable on the basis of the brightness signal from said amplitude adjustment means, a pattern memory for storing a predetermined pattern range of a bit string generated by said pattern means, pattern memory readout means for performing sequential read access to said pattern memory in accordance with an inspection progress, and calculation means for synthesizing data from said respective data generation circuits for each data type combination in accordance with a predetermined calculation method, and outputting a synthesis result, and wherein said calculation means calculates the data by the following relation:

$$k1d1+k2d2 \text{ for } 0<k1<1 \text{ and } -1<k2 \leq 1$$

where d1 is chromium data, d2 is phase shift data, and k1 and k2 are coefficients.

27. A pattern data generating apparatus according to claim 3, further comprising a reference data generating section to obtain reference data by convolving the gray value data with a point spread function.

28. A pattern data generating apparatus according to claim 1, wherein said computation section outputs a treated limiting amplitude as the gray value data.

29. A pattern data generating apparatus according to claim 1, which includes rounding up or chopping section for calculating the output gray value data.

30. A method a generating a pattern data comprising the steps of:
    storing in a storage a plurality of design pattern data prepared by a pattern designer and representing a design pattern; and
    generating a decoded figure having a figure shape, a figure position and a figure size from each of the design pattern data read out from said storage;
    casting the decoded figure to a plurality of arrayed squares each having a predetermined size and divided into a plurality of segments arranged in a matrix;
    computing occupation ratios defining how much of each square is occupied by the figure in relation to how many segments of each square are occupied by the figure how each of the squares is occupied by the figure; and
    outputting a plurality of gray scale level data representing 0 to n gray scale levels corresponding to the occupation ratios, respectively.

31. A method of inspecting a pattern comprising the steps of:
    irradiating light having an appropriate wavelength on a specimen on which a pattern is formed, to obtain measurement data corresponding to a pattern image received by a photosensor;
    storing, in a storage, pattern design data used to form the pattern on the specimen, the pattern data representing a design pattern prepared by a pattern designer;
    developing every pixel of the pattern design data read out from the storage; and
    comparing data obtained by filtering the data developed by the developing step with the measurement pattern data, to determine the presence/absence of a defect of the pattern formed on the specimen,
    wherein the storing step includes storing light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, the phase shift pattern design data being multivalue data, and
    said developing step includes identifying a light shield pattern or a phase shift pattern, determining an amplitude and offset a brightness signal for each predetermined description unit on the basis of identification result, allowing bit weighting, inversion and a sign to be variable on the basis of the brightness signal, storing in a pattern memory a predetermined pattern range of a bit string, performing sequential read access to said pattern memory in accordance with an inspection progress, and synthesizing data obtained for each data type combination in accordance with a predetermined calculation method, and outputting a synthesis result.

32. A method of generating pattern data comprising the steps of:
    storing design data prepared by a pattern designer in a storage;
    generating a decoded figure having a figure shape, a figure position and a figure size from each of the design pattern data read out from said storage;
    casting the decoded figure to a plurality of arrayed squares each having a predetermined size and divided into a plurality of segments arranged in a matrix;
    computing occupation ratios defining how much of each square is occupied by the figure in relation to how many segments of each square are occupied by the figure; and
    outputting a plurality of gray scale level data representing 0 to n gray scale levels corresponding to the occupation ratios, respectively;
    storing the gray scale level data in the storage by a predetermined range; and
    reading out gray scale level data of each of the squares from the storage; and
    adding values of squares having identical coordinates to obtain a sum, in read-accessing.

33. A pattern data generating apparatus comprising:
    a storage configured to store a plurality of design pattern data prepared by a pattern designer and representing a design pattern; and
    a decoder configured to obtain a decoded figure having a figure shape, a figure position and a figure size from each of the design pattern data read out from said storage;
    a casting section configured to cast the decoded figure to a plurality of arrayed squares each having a predetermined size;
    a computing section configured to compute how each of the squares is occupied by the figure to obtain occupation ratios;
    an output section to output a plurality of gray value data representing the occupation ratios, respectively,
    a pattern memory section configured to store the gray value data from said output section by a predetermined range, and a readout section configured to read out the gray value data from said memory section, and
    an accumulative write section configured to read out the gray value data already present in the squares before new data is written in said pattern memory section, adding the readout gray value data and the new data to obtain sums, and writing the sums in the square, and
    wherein said cumulative write section has an upper limit clamp function of writing a predetermined threshold value when the sums exceed the threshold value.

34. A pattern data generating apparatus comprising:

a storage configured to store a plurality of design pattern data prepared by a pattern designer and representing a design pattern; and a decoder configured to obtain a decoded figure having a figure shape, a figure position and a figure size from each of the design pattern data read out from said storage;

a casting section configured to cast the decoded figure to a plurality of arrayed squares each having a predetermined size;

a computing section configured to compute how each of the squares is occupied by the figure to obtain occupation ratios;

an output section to output a plurality of gray value data representing the occupation ratios, respectively, a pattern memory section configured to store the gray value data from said output section by a predetermined range, and a readout section configured to read out the gray value data from said memory section, and wherein said pattern generating section comprises a plurality of pattern generators for generating multivalue level bit pattern data, said pattern memory comprises a plurality of pattern memories respectively corresponding to said pattern generators, and which further comprises a data distribution arbitrator for distributing input data so as to cause said plurality of pattern generators to perform parallel processing, and a pattern data adder for, when said plurality of pattern memories are to be read-accessed, adding values of squares having identical coordinates to obtain a sum and outputting the sum to said readout section.

35. A pattern data generating apparatus according to claim 34, wherein said pattern data adder has an upper limit clamp function of outputting a predetermined threshold value to said readout section when the sum exceeds the predetermined threshold value.

36. A pattern inspection machine comprising:

an image acquisition section configured to irradiate light having an appropriate wavelength on a specimen on which a pattern is formed, and acquiring measurement data corresponding to a pattern image received by a photosensor;

a memory configured to store pattern design data used to form the pattern on the specimen, the pattern data representing a design pattern prepared by a pattern designer;

a data development/generation section configured to develop every pixel of the pattern design data read out from the memory; and a determination section configured to compare data obtained by filtering the data developed by the data development section with the measurement pattern data and determining the presence/absence of a defect of the pattern formed on the specimen, wherein the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, the phase shift pattern design data being multivalue data, and said data development/generation section comprises a light shield pattern design data generation circuit and a phase shift pattern design data generation circuit, each of which comprises identification means for identifying a light shield pattern or a phase shift pattern, amplitude adjusting means for determining an amplitude and offset of a brightness signal for each predetermined description unit on the basis of an identification signal from said identification means patted means for allowing bit weighting, inversion and a sign to be variable on the basis of the brightness signal from said amplitude adjustment means, a pattern memory for storing a predetermined pattern range of a bit string generated by said pattern means, pattern memory readout means for performing sequential read access to said pattern memory in accordance with an inspection progress, and calculation means for synthesizing data from said respective data generation circuits for each data type combination in accordance with a predetermined calculation method, and outputting a synthesis result, and wherein said calculation means calculates the data by the following relation:

$$k1d1+k2d2 \text{ for } 0<k1<1 \text{ and } -1<k2\leq 1$$

where d1 is chromium data, d2 is phase shift data, and k1 and k2 are coefficients.

37. A pattern inspection machine comprising:

an image acquisition section configured to irradiate light having an appropriate wavelength on a specimen on which a pattern is formed, and acquiring measurement data corresponding to a pattern image received by a photosensor;

a memory configured to store pattern design data used to form the pattern on a specimen, the pattern data representing a design pattern prepared by a pattern designer;

a data development/generation section configured to develop every pixel of the pattern design data read out from the memory; and a determination section configured to compare data obtained by filtering the data developed by the data development section with the measurement pattern data, and determining the presence/absence of a defect of the pattern formed on the specimen, wherein the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, the phase shift pattern design data being multivalue data;

said data development/generation section comprises a light shield pattern design data generation circuit and a phase shift pattern design data generation circuit, each of which comprises identification means for identifying a light shield pattern or a phase shift pattern, amplitude adjusting means for determining an amplitude and offset of a brightness signal for each predetermined description unit on the basis of an identification signal from said identification means, pattern means for allowing bit weighting, inversion and a sign to be variable on the basis of the brightness signal from said amplitude adjustment means, a pattern memory for storing a predetermined pattern range of a bit string generated by said pattern means, pattern memory readout means for performing sequential read access to said pattern memory in accordance with an inspection progress, and calculation means for synthesizing data from said respective data generation circuits for each data type combination in accordance with a predetermined calculation method, and outputting a synthesis result; and said cumulative write means of said data development/generation section has an upper limit clamp function of writing a predetermined threshold value, when the sum exceeds the predetermined threshold value.

38. A pattern inspection machine comprising:

an image acquisition section configured to irradiate light having an appropriate wavelength on a specimen on which a pattern is formed, and acquiring measurement data corresponding to a pattern image received by a photosensor;

a memory configured to store pattern design data used to form the pattern on the specimen, the pattern data representing a design pattern prepared by a pattern designer;

a data development/generation section configured to develop every pixel of the pattern design data read out from the memory; and a determination section configured to compare data obtained by filtering the data developed by the data development section with the measurement pattern data, and determining the presence/absence of a defect of the pattern formed on the specimen, wherein the memory stores light shield pattern design data used to form a light shield pattern on the specimen and phase shift pattern design data used to form a phase shift pattern so as to define the light shield pattern design data and the phase shift pattern design data on the same coordinate system and allow identification of the light shield pattern design data and the phase shift pattern data, the phase shift pattern design data being multivalue data;

said data development/generation section comprises a light shield pattern design data generation circuit and a phase shift pattern design data generation circuit each of which comprises identification means for identifying a light shield pattern or a phase shift pattern amplitude adjusting means for determining an amplitude and offset of a brightness signal for each predetermined description unit on the basis of an identification signal from said identification means, pattern means for allowing bit weighting, inversion and a sign to be variable on the basis of the brightness signs from said amplitude adjustment means, a pattern memory for storing a predetermined pattern rage of a bit string generated by said pattern means, pattern memory readout means for performing sequential read access to said pattern memory in accordance with an inspection progress, and calculation means for synthesizing data from said respective data generation circuits for each data type combination in accordance with a predetermined calculation method, and outputting a synthesis result; and said data development/generation section comprises a plurality of pattern generators and a plurality of pattern memories, and said specimen inspection machine further comprises data distribution arbitration means for distributing input data so as to cause said plurality of pattern generators to efficiently perform parallel processing, and pattern adding means for adding bit strings having identical coordinates to obtain a sum and outputting the sum to said pattern memory readout means, when said plurality of pattern memories are to be read-accessed.

39. An apparatus according to claim 38, wherein said bit pattern adding means has an upper limit clamp function of outputting a predetermined threshold value to said pattern memory readout means, when the sum exceeds predetermined threshold value.

40. A pattern data generating apparatus comprising:

a storage configured to store design data;

a decoder configured to obtain a decoded figure having a figure shape, a figure position and a figure size from each of the design pattern data read out from said storage;

a casting section configured to cast the decoded figure to a plurality of arrayed squares each having a predetermined size;

a computing section configured to compute how each of the squares is occupied by the figure to obtain occupation ratios, and;

an output section to output a plurality of gray value data representing the occupation ratios, respectively;

a pattern memory section configured to store the gray value data from said output section by a predetermined range; and a readout section configured to read out the gray value data of each of the squares from said pattern memory section, and wherein said output section comprises a plurality of pattern generators for generating multivalue level bit pattern data, said pattern memory comprises a plurality of pattern memories respectively corresponding to said patterns, generators, and which further comprises a data distribution arbitrator for distributing input data so as to cause said plurality of pattern generators to perform parallel processing, and a pattern data adder for, in read accessing of said plurality of pattern memories, adding values of squares having identical coordinates to obtain a sum and outputting the sum to said readout section, and said pattern data adder has an upper limit clamp function of outputting a predetermined threshold value to said readout section when the sum exceeds the predetermined threshold value.

* * * * *